United States Patent
Xu et al.

(10) Patent No.: US 12,021,414 B2
(45) Date of Patent: Jun. 25, 2024

(54) ROTOR, ELECTRIC MOTOR AND COMPRESSOR

(71) Applicant: GUANGDONG MEIZHI COMPRESSOR CO., LTD., Guangdong (CN)

(72) Inventors: Fei Xu, Guangdong (CN); Xiaohua Qiu, Guangdong (CN); Liyu Zheng, Guangdong (CN)

(73) Assignee: GUANGDONG MEIZHI COMPRESSOR CO., LTD., Guangdong (CN)

( * ) Notice: Subject to any disclaimer, the term of this patent is extended or adjusted under 35 U.S.C. 154(b) by 600 days.

(21) Appl. No.: 17/111,943

(22) Filed: Dec. 4, 2020

(65) Prior Publication Data

US 2021/0091616 A1    Mar. 25, 2021

Related U.S. Application Data

(63) Continuation of application No. PCT/CN2018/115714, filed on Nov. 15, 2018.

(30) Foreign Application Priority Data

Jun. 20, 2018   (CN) .......................... 201810636348.8
Jun. 20, 2018   (CN) .......................... 201810637504.2

(51) Int. Cl.
*H02K 1/27*       (2022.01)
*H02K 1/276*     (2022.01)

(52) U.S. Cl.
CPC ......... *H02K 1/276* (2013.01); *H02K 2213/03* (2013.01)

(58) Field of Classification Search
CPC ...... H02K 1/276; H02K 1/2766; H02K 29/03; H02K 2213/03

(Continued)

(56) References Cited

U.S. PATENT DOCUMENTS 6,218,753 B1 * 4/2001 Asano .................... H02K 1/276
                                                    310/156.53
8,212,447 B2 * 7/2012 Fukuda ................ H02K 1/2766
                                                    310/156.53

(Continued)

FOREIGN PATENT DOCUMENTS

CN    202550730 U    11/2012
CN    203387314 U    1/2014

(Continued)

OTHER PUBLICATIONS

Notice of Reasons for Refusal dated Dec. 7, 2021 received in Japanese Patent Application No. JP 2020-565457 together with an English language translation.

(Continued)

*Primary Examiner* — Alex W Mok
(74) *Attorney, Agent, or Firm* — Scully, Scott, Murphy & Presser, P.C.

(57) ABSTRACT

A rotor, a motor and a compressor are provided. The rotor has multiple first punches and multiple second punches, which are stacked to form a rotor core of the rotor. Multiple openings are provided in each of the first punches and second punches along a circumferential direction of the rotor. The openings divide the first punches and the second punches into a rotor yoke and multiple pole caps. The pole caps are arranged around the outer circumference of the rotor yoke. The openings extend in an axial direction of the rotor core to form a plurality of slots. Multiple magnets are arranged in the slots in a one-to-one correspondence. Each first punch includes one or more connecting ribs. Each connecting rib is disposed between adjacent two pole caps. At least two of the openings of each second punch communicate with each other.

18 Claims, 17 Drawing Sheets

(58) Field of Classification Search
USPC .................................................. 310/156.53
See application file for complete search history.

(56) References Cited

U.S. PATENT DOCUMENTS

| | | | | |
|---|---|---|---|---|
| 8,405,271 | B2* | 3/2013 | Lee | H02K 29/03 |
| | | | | 310/156.53 |
| 9,083,225 | B2* | 7/2015 | Tonogi | H02K 1/148 |
| 9,306,422 | B2* | 4/2016 | Berkouk | H02K 1/06 |
| 9,472,985 | B2* | 10/2016 | Kawaji | H02K 1/276 |
| 2004/0239200 | A1* | 12/2004 | Strahan | H02K 21/185 |
| | | | | 310/159 |
| 2006/0103253 | A1* | 5/2006 | Shiga | H02K 15/03 |
| | | | | 310/43 |
| 2009/0152972 | A1* | 6/2009 | Nishijima | H02K 1/276 |
| | | | | 310/156.56 |
| 2010/0244609 | A1* | 9/2010 | Takahata | H02K 1/276 |
| | | | | 310/156.53 |
| 2012/0256508 | A1* | 10/2012 | Suzuki | H02K 1/2766 |
| | | | | 310/156.38 |
| 2013/0127280 | A1* | 5/2013 | Sugimoto | H02K 1/02 |
| | | | | 310/156.01 |
| 2014/0021820 | A1* | 1/2014 | Kondou | H02K 1/276 |
| | | | | 310/156.53 |
| 2014/0042861 | A1* | 2/2014 | Kawaji | H02K 1/276 |
| | | | | 310/156.53 |
| 2014/0084735 | A1* | 3/2014 | Miyashita | H02K 1/276 |
| | | | | 310/156.53 |
| 2015/0069874 | A1* | 3/2015 | Iki | H02K 1/274 |
| | | | | 310/156.11 |
| 2016/0285326 | A1* | 9/2016 | Kawamura | H02K 15/03 |
| 2016/0285330 | A1* | 9/2016 | Mukai | F25B 31/026 |
| 2017/0093237 | A1* | 3/2017 | Tsuda | H02K 29/03 |

FOREIGN PATENT DOCUMENTS

| | | |
|---|---|---|
| CN | 105474513 A | 4/2016 |
| CN | 206575252 U | 10/2017 |
| CN | 107591914 A | 1/2018 |
| CN | 108063502 A | 5/2018 |
| CN | 208241435 U | 12/2018 |
| CN | 208299561 U | 12/2018 |
| EP | 2 696 472 A2 | 2/2014 |
| JP | 2004-096978 A | 3/2004 |
| JP | 2004-254403 A | 9/2004 |
| JP | 2008-092715 A | 4/2008 |
| JP | 2012050274 A | 3/2012 |
| WO | 2018/062489 A1 | 4/2018 |
| WO | WO 2018/062489 A1 | 4/2018 |

OTHER PUBLICATIONS

Request for the Submission of an Opinion dated Aug. 16, 2022 received in Korean Patent Application No. KR 10-2020-7032931.
Notice of Reasons for Refusal dated Jun. 14, 2022 received in Japanese Patent Application No. JP 2020-565457 together with an English language translation.
International Search Report dated Mar. 18, 2019 received in International Application No. PCT/CN2018/115714.
Extended European Search Report dated Jun. 9, 2021 received in European Patent Application No. EP 18923169.9.
Notice of Reasons for Refusal dated Nov. 29, 2022 received in Japanese Patent Application No. JP 2020-565457.
Notice of Final Rejection dated Feb. 3, 2023 received in Korean patent Application No. KR 10-2020-7032931.
First Office Action dated Apr. 29, 2024 received in Chinese Patent Application No. CN 201810636348.8.
First Office Action dated Apr. 28, 2024 received in Chinese Patent Application No. CN 201810637504.2.

* cited by examiner

ROTOR, ELECTRIC MOTOR AND COMPRESSOR

CROSS-REFERENCES TO RELATED APPLICATIONS

The present application is continuation of PCT International Application No. PCT/CN2018/115714, filed on Nov. 15, 2018, which claims the priority of Chinese Patent Application No. 201810636348.8, filed with the Chinese Patent Office on Jun. 20, 2018 and entitled "ROTOR, ELECTRIC MOTOR AND COMPRESSOR", and the priority of Chinese Patent Application No. 201810637504.2, filed with the Chinese Patent Office on Jun. 20, 2018 and entitled "ROTOR AND ELECTRIC MOTOR", the entire contents of which are herein incorporated by reference for all purposes. No new matter has been introduced.

FIELD

The present disclosure relates to the field of a compressor, and more particularly, relates to a rotor, an electric motor and a compressor.

BACKGROUND

Among the existing rotary DC inverter compressors that use electric motors, electric motors generally use built-in permanent magnet motors. Due to the magnetic bridge in the rotor core, the rotor structure has a large magnetic leakage. By reducing the width of the magnetic isolation bridge, the magnetic leakage can be reduced and the performance of the electric motor can be improved. However, if the width of the magnetic isolation bridge is overly small, the mechanical strength of the rotor will be weakened, and the rotor core will be deformed at high speeds, which will affect the performance. A more serious situation is that the bore will be scanned, the stator and the rotor will collide, and the compressor pump body is stuck, the electric motor is blocked and the winding is damaged. Therefore, this type of electric motor has a design contradiction between the improvement of running performance and the assurance of mechanical strength.

Since the magnet of the traditional built-in permanent magnet motor is provided inside the rotor core, under load conditions, the armature reacts strongly, especially under the weak magnetic condition or even the short circuit condition, which makes the electric motor easy to demagnetize.

SUMMARY

The present disclosure aims to solve at least one of the technical problems existing in the prior art or related technologies.

To this end, the first aspect of the present disclosure is to provide a rotor.

The second aspect of the present disclosure is to provide a rotor.

The third aspect of the present disclosure is to provide a rotor.

The fourth aspect of the present disclosure is to provide an electric motor.

The fifth aspect of the present disclosure is to provide a compressor.

In view of this, according to the first aspect of the present disclosure, a rotor is provided for electric motor, the rotor comprises: a plurality of first punches and a plurality of second punches stacked to form a rotor core; a plurality of openings provided on each of the plurality of first punches and the plurality of second punches along a circumferential direction, the plurality of openings dividing the plurality of first punches and the plurality of second punches into a rotor yoke and a plurality of pole caps, the plurality of pole caps arranged around the outer circumference of the rotor yoke, the plurality of openings penetrating along an axial direction of the rotor core to form a plurality of slots; and a plurality of magnets arranged in the plurality of slots in a one-to-one correspondence, wherein each of the plurality of first punches includes at least one connecting rib, any one of the at least one connecting rib is disposed between adjacent two of the plurality of pole caps, and at least two of the plurality of openings of each of the plurality of second punches communicate with each other.

According to the second aspect of the present disclosure, a rotor is provided for electric motor, the rotor comprises: a plurality of first punches and a plurality of second punches stacked to form a rotor core; a plurality of openings provided on each of the plurality of first punches and the plurality of second punches along a circumferential direction, the plurality of openings dividing the plurality of first punches and the plurality of second punches into a rotor yoke and a plurality of pole caps, the plurality of pole caps arranged around the outer circumference of the rotor yoke, the plurality of openings penetrating along an axial direction of the rotor core to form a plurality of slots; and a plurality of magnets arranged in the plurality of slots in a one-to-one correspondence, wherein each of the plurality of first punches includes at least one connecting rib, any one of the at least one connecting rib is disposed between adjacent two of the plurality of pole caps, the plurality of openings of the first punches are not communicated with each other, and at least two of the plurality of openings of each of the plurality of second punches communicate with each other.

The rotor provided by the present disclosure comprises a plurality of first punches, a plurality of second punches, a plurality of openings, and a plurality of magnets, the plurality of first punches and the plurality of second punches are stacked to form a rotor core; the plurality of openings are provided on each of the plurality of first punches and the plurality of second punches along a circumferential direction, the plurality of openings dividing the plurality of first punches and the plurality of second punches into a rotor yoke and a plurality of pole caps, the plurality of pole caps are arranged around the outer circumference of the rotor yoke, the plurality of openings penetrate along the axial direction of the rotor core to form a plurality of slots; and the plurality of magnets are arranged in the plurality of slots in a one-to-one correspondence. Optionally, the magnets are in the shape of sheet or arc, and the magnets are matched with the slots, each of the plurality of first punches includes at least one connecting rib, any one of the at least one connecting rib is disposed between adjacent two of the plurality of pole caps, optionally, the connecting rib is connected with rotor yoke, and a plurality of openings of first punches are not connected to each other, and at least two of the plurality of openings of each of the plurality of second punches communicate with each other. In addition, the magnets of different polarities in the plurality of magnets are alternately arranged in the openings. The first punches with connecting ribs provided by the present disclosure have higher mechanical strength, thereby avoiding the deformation of the rotor core during high-speed rotation and affecting the performance of the electric motor. By connecting at least two openings in the plurality of openings on each of second punches, the magnets of different polarities are connected through the connected openings, which effectively reduces the rotor magnetic leakage, improves the air gap magnetic density amplitude, reduces copper consumption, and improves the performance of the electric motor.

In addition, the rotor in the above-mentioned technical solution provided by the present disclosure may also have the following additional technical features.

In the above-mentioned technical solution, optionally, a minimum radial thickness of the connecting rib of the first punches is W1, each of the plurality of second punches includes at least one connecting rib, any one of the at least one connecting rib is disposed between adjacent two of the plurality of pole caps, and a minimum radial thickness of the connecting rib of the second punches is W2, and it satisfies $0.2 \leq W2/W1 \leq 2$.

In this technical solution, a minimum radial thickness of the connecting rib of the first punches is W1, each of the plurality of second punches includes at least one connecting rib, any one of the at least one connecting rib is disposed between adjacent two of the plurality of pole caps, and a minimum radial thickness of the connecting rib of the second punches is W2. By limiting $0.2 \leq W2/W1 \leq 2$, it can ensure that the mechanical strength of the rotor core is ensured under the premise of good electric motor running performance and prevent the rotor core from deforming during high-speed rotation. Optionally, $W2/W1=0.6$, at this time, the back EMF is higher, the efficiency improvements of electric motor is better, the cost is reduced to a certain extent, and the mechanical strength is better. When $W2/W1<0.2$, the mechanical strength of the rotor core is low, easy to deform, and the reliability of the electric motor is poor; when $W2/W1>2$, the back EMF effect is not obvious, and the efficiency improvements of the electric motor is not obvious.

In any of the above-mentioned technical solutions, optionally, adjacent two of the plurality of pole caps in the second punches are not connected to each other.

In this technical solution, adjacent two of the plurality of pole caps in the second punches are not connected to each other, that is, the second punches do not have connecting ribs, which can effectively remove part of the magnetic bridge on the axis of the rotor core, reduce the strength of the armature reaction, and effectively improve the anti-demagnetization ability of the electric motor. The use of different structures of the first punches and the second punches can effectively reduce rotor magnetic leakage, increase the air gap magnetic density amplitude, reduce copper loss, and improve the performance of the electric motor.

According to the third aspect of the present disclosure, a rotor is proposed for electric motor, the rotor comprises: a plurality of first punches, a plurality of second punches, a plurality of openings, and a plurality of magnets, the plurality of first punches and the plurality of second punches are stacked to form a rotor core; the plurality of openings are provided on each of the plurality of first punches and the plurality of second punches along a circumferential direction, the plurality of openings dividing the plurality of first punches and the plurality of second punches into a rotor yoke and a plurality of pole caps, the plurality of pole caps are arranged around the outer circumference of the rotor yoke, the plurality of openings penetrate along the axial direction of the rotor core to form a plurality of slots; and the plurality of magnets are arranged in the plurality of slots in a one-to-one correspondence, wherein each of the plurality of first punches includes at least one connecting rib, any one of the at least one connecting rib is disposed between adjacent two of the plurality of pole caps, adjacent two of the plurality of pole caps in the second punches are not connected to each other.

The rotor provided by the present disclosure comprises a plurality of first punches, a plurality of second punches, a plurality of openings, and a plurality of magnets, the plurality of first punches and the plurality of second punches are stacked to form a rotor core; the plurality of openings are provided on each of the plurality of first punches and the plurality of second punches along a circumferential direction, the plurality of openings dividing the plurality of first punches and the plurality of second punches into a rotor yoke and a plurality of pole caps, the plurality of pole caps are arranged around the outer circumference of the rotor yoke, the plurality of openings penetrate along the axial direction of the rotor core to form a plurality of slots; and the plurality of magnets are arranged in the plurality of slots in a one-to-one correspondence. Optionally, the magnets are in the shape of sheet or arc, and the magnets are matched with the slots, each of the plurality of first punches includes at least one connecting rib, any one of the at least one connecting rib is disposed between adjacent two of the plurality of pole caps, optionally, the connecting rib is connected with rotor yoke, adjacent two of the plurality of pole caps in the second punches are not connected to each other, the rotor core of the present disclosure is formed by stacking the first punches that include at least one connecting rib and the second punches that do not have connecting ribs. The connecting ribs can ensure the mechanical strength of the first punches and prevent the rotor core from deforming during high-speed rotation and affecting the performance of the electric motor. Since the adjacent two of the plurality of pole caps of the second punches are not connected to each other, that is, the second punches do not have connecting ribs, can effectively remove part of the magnetic bridge in the axial direction of the rotor core, reduce the strength of the armature reaction, and effectively improve the anti-demagnetization ability of the electric motor. In the present disclosure, the use of different structures of the first punches and the second punches can effectively reduce rotor magnetic leakage, increase the air gap magnetic density amplitude, reduce copper loss, and improve the performance of the electric motor.

In any of the above-mentioned technical solutions, optionally, the plurality of first punches includes a plurality of first sub-punches and a plurality of second sub-punches, and the connecting rib is provided between each adjacent two of the plurality of pole caps of each of the plurality of first sub-punches, each of the plurality of pole caps of each of the plurality of second sub-punches is a first pole cap, and one end of the first pole cap is connected to adjacent pole cap through the connecting rib, and the other end of the first pole cap is not connected to the adjacent pole cap, the second punches are sandwiched between the first sub-punches; and/or the second sub-punches are sandwiched between the first sub-punches; and/or the second punches are sandwiched between the second sub-punches.

In this technical solution, the plurality of first punches includes a plurality of first sub-punches and a plurality of second sub-punches, wherein the connecting rib is provided between each adjacent two of the plurality of pole caps of each of the plurality of first sub-punches, that is, the every two pole caps on the first sub-punches are connected by connecting ribs to ensure the mechanical strength of the first punches and avoid the deformation of the rotor core during high-speed rotation and affect the performance of the electric motor; each of the plurality of pole caps of each of the plurality of second sub-punches is a first pole cap, and one end of the first pole cap is connected to adjacent pole cap through the connecting rib, and the other end of the first pole cap is not connected to the adjacent pole cap, that is, the second sub-punches are provided with connecting ribs at intervals, and some pole caps are connected by connecting ribs, and the other pole caps are not connected to each other. That is, the second sub-punches are provided with connecting ribs at intervals, and part of pole caps are connected by connecting ribs, and the other pole caps are not connected to each other. Therefore, the second sub-punches can ensure its own mechanical strength under the action of the connecting ribs, and prevent the rotor core from deforming during high-speed rotation and affecting the performance of the electric motor, on the other hand, since part of the pole caps on the second sub-punches are not connected to each other, part of the magnetic bridge in the axial direction of the rotor core can be effectively removed, which reduces the strength of the armature reaction and effectively improves the anti-demagnetization ability of the electric motor. In addition, the second punches are sandwiched between the first sub-punches; and/or the second sub-punches are sandwiched between the first sub-punches; and/or the second punches are sandwiched between the second sub-punches. That is, the rotor core is formed by stacking the first sub-punches, the second sub-punches and the second punches of different structures, and the stacking methods of the first sub-punches, the second sub-punches and the second punches are diversified, thereby effectively reducing rotor magnetic leakage, increase the air gap magnetic density amplitude, reduce copper loss, and improve the performance of the electric motor.

In any of the above-mentioned technical solutions, optionally, projections of the connecting rib of the plurality of second sub-punches and projections of the connecting rib of the plurality of first sub-punches on a plane perpendicular to the axial direction of the rotor core completely overlap.

In this technical solution, projections of the connecting rib of the plurality of second sub-punches and projections of the connecting rib of the plurality of first sub-punches on a plane perpendicular to the axial direction of the rotor core completely overlap, the plurality of second sub-punches includes the first-type second sub-punches and the second-type second sub-punches, the sum of the projection of the connecting ribs of the first-type second sub-punches and the second-type second sub-punches on the plane perpendicular to the axis of the rotor core, and the projection of the connecting ribs of the first sub-punches on the plan perpendicular to the axis of the rotor core completely overlap. That is, the first-type second sub-punches and the second-type second sub-punches are misaligned and stacked, and the connecting ribs of the first-type second sub-punches corresponds to the area stacking without connecting ribs on the second-type second sub-punches. In addition, the second punches are sandwiched between the first sub-punches, and/or the first-type second sub-punches are sandwiched between the first sub-punches, and/or the second-type second sub-punches are sandwiched between the first sub-punches, and/or the second punches are sandwiched between the first-type second sub-punches, and/or the second punches are sandwiched between the second-type second sub-punches. The rotor core is formed by stacking different structures of the first sub-punches, the first-type second sub-punches, the second-type second sub-punches and the second punches, and the stacking methods of the first sub-punches, the first-type second sub-punches, the second-type second sub-punches and the second punches are diversified, thereby effectively reducing rotor magnetic leakage, increase the air gap magnetic density amplitude, reduce copper loss, and improve the performance of the electric motor.

In any of the above-mentioned technical solutions, optionally, a stack thickness of the plurality of first sub-punches is L1, and a sum of a stack thickness of the plurality of second punches and the plurality of second sub-punches is L, and it satisfies $0.0105(L1+L) \leq L1 \leq 0.1(L1+L)$.

In this technical solution, a stack thickness of the plurality of first sub-punches is L1, and a sum of a stack thickness of the plurality of second punches and the plurality of second sub-punches is L, and it satisfies $0.0105(L1+L) \leq L1 \leq 0.1(L1+L)$. By limiting the sum of the stack thickness of the plurality of the first sub-punches and the stack thickness of the second punches and the second sub-punches, thereby the rotor magnetic leakage is reduced, the air gap magnetic density amplitude is increased, the copper loss is reduced, and the performance of the electric motor is improved. In addition, since the adjacent two of the plurality of pole caps in the second punches are not connected to each other, the second punches can effectively reduce the strength of the armature reaction, thereby improving the anti-demagnetization ability of the electric motor.

In any of the above-mentioned technical solutions, optionally, when the magnet is a radially magnetized magnet, rivet holes or rivet buckles are provided on each of the plurality of pole caps of the first punches and the second punches, so that the plurality of first punches and the plurality of second punches are connected.

In this technical solution, when the magnet adopts the radial magnetization method, the rivet holes or the rivet buckles are provided on each of the plurality of pole caps of the first punches and the second punches, and the plurality of first punches and the plurality of second punches can be connected by the rivet buckles arranged on each pole cap, or by screwing the rivets into the rivet holes on each pole cap of the plurality of first punches and the plurality of second punches, so that the plurality of first punches and the plurality of second punches are connected. Of course, the plurality of first punches and the plurality of second punches can also be connected by other fixing structures, as long as they do not deviate from the design concept of the present disclosure, they all fall within the protection scope of the present disclosure.

In any of the above-mentioned technical solutions, optionally, when the magnet is a tangentially magnetized magnet, rivet holes or rivet buckles are provided on each of the plurality of pole caps of the first punches and the second punches, and the rivet holes or the rivet buckles are located between two magnets of same polarity in the plurality of magnets.

In this technical solution, when the magnets adopts the tangential magnetization method, the rivet holes or the rivet buckles are provided on each of the plurality of pole caps of the first punches and the second punches, and the rivet holes or the rivet buckles are located between two magnets of the same polarity in the plurality of magnets, the plurality of first punches and the plurality of second punches can be connected by the rivet buckles arranged on each pole cap, or by screwing the rivets into the rivet holes on each pole cap of the plurality of first punches and the plurality of second punches, so that the plurality of first punches and the plurality of second punches are connected. Of course, the plurality of first punches and the plurality of second punches can also be connected by other fixing structures, as long as they do not deviate from the design concept of the present disclosure, they all fall within the protection scope of the present disclosure.

In any of the above-mentioned technical solutions, optionally, the rivet holes are round, triangular, hexagonal; and/or the rivet buckles are rectangular or round.

In this technical solution, the rivet holes are round, triangular, hexagonal or other shapes; and/or the rivet buckles are rectangular, round or other shapes, which can be provided on the pole caps according to actual needs, effectively improving the flexibility of installation and connection between the first punches and the second punches.

In any of the above-mentioned technical solutions, optionally, the magnet is a straight magnet or a V-shaped magnet; and/or the magnet is a rare earth magnet, a ferrite magnet or a rare earth and ferrite mixed magnet.

In this technical solution, the magnet is a straight magnet or a V-shaped magnet or other shapes of magnet, specifically, the magnet can be a hybrid structure of radial and tangential, and the slot is matched with the magnet; and/or the magnet is a rare earth magnet, a ferrite magnet, or a rare earth and ferrite mixed magnet, wherein the magnet can also have other shapes, and the magnet can also be made of other materials, as long as they meet the design concept of the present disclosure, they all fall within the protection scope of the present disclosure.

According to the fourth aspect of the present disclosure, an electric motor is provided, the electric motor comprises the rotor as described in any of the above-mentioned technical solutions, and therefore has all the beneficial effects of the rotor, and will not be repeated here.

In any of the above-mentioned technical solutions, optionally, the electric motor further comprising: a stator body arranged around an outside of the rotor, wherein a rated torque of the electric motor is T, an inner diameter of the stator body is Di, and a torque per unit volume of the rotor is TPV, and it satisfies $5.18 \times 10^{-7} \leq T \times Di^{-3} \times TPV^{-1} \leq 1.17 \times 10^{-6}$, $5 \text{ kN·m·m}^{-3} \leq TPV \leq 45 \text{ kN·m·m}^{-3}$, the unit of rated torque T is N·m, the unit of inner diameter Di is mm, and the unit of torque per unit volume TPV is kN·m·m$^{-3}$.

In this technical solution, the electric motor further comprising: a stator body arranged around an outside of the rotor, wherein a rated torque of the electric motor is T, an inner diameter of the stator body is Di, and a torque per unit volume of the rotor is TPV, and it satisfies $5.18 \times 10^{-7} \leq T \times Di^{-3} \times TPV^{-1} \leq 1.17 \times 10^{-6}$, the value range of the torque per unit volume TPV is $5 \text{ kN·m·m}^{-3} \leq TPV \leq 45 \text{ kN·m·m}^{-3}$. By limiting the value range of the combined variable of the rated torque T of the electric motor, the inner diameter Di of the stator body and the torque per unit volume TPV of the rotor, the electric motor can meet the power demand of the compressor. In addition, for the electric motor and the compressor using the rotor, it can effectively reduce rotor magnetic leakage, increase the utilization of permanent magnets, and improve the efficiency of electric motor.

In the above-mentioned technical solution, optionally, the stator body further includes a plurality of stator protruding teeth and a plurality of stator slots, the plurality of stator protruding teeth are arranged on an inner side wall of the stator body facing the rotor, and each of the plurality of stator slots is provided between adjacent two of the plurality of stator protruding teeth, a coil is straddled one of the stator protruding teeth and located in the stator slot; the number of the stator slots is Z, and the number of pole pairs of the rotor is P, and it satisfies Z/2P=3/2 or 6/5 or 6/7 or 9/8 or 9/10.

In this technical solution, the stator body further includes a plurality of stator protruding teeth and a plurality of stator slots, the plurality of stator protruding teeth are arranged on an inner side wall of the stator body facing the rotor, and each of the plurality of stator slots is provided between adjacent two of the plurality of stator protruding teeth. When the number of the stator protruding teeth that a coil crosses is one, that is, the coil crosses a stator protruding tooth and is located in the stator slot, limiting the proportional relationship between the number Z of the stator slots and the number of the pole pairs P of the rotor, and then limiting the pole groove fit of the electric motor. Wherein when the number of the pole pairs of the rotor is P, the number of the poles of the rotor is 2P, that is, the electric motor can be a 6-pole 9-slot electric motor, a 4-pole 6-slot electric motor, a 8-pole 12-slot electric motor, and a 10-pole 9-slot electric motor, a 10-pole 12-slot electric motor, a 8-pole 9-slot electric motor, the above type of the electric motor can effectively reduce rotor magnetic leakage, increase magnetic flux, and help improve the efficiency of the electric motor.

According to the fifth aspect of the present disclosure, a compressor is provided, the compressor comprises the rotor or the electric motor as described in any of the above-mentioned technical solutions, and therefore has all the beneficial effects of the rotor or the electric motor, and will not be repeated here.

Additional aspects and advantages of the present disclosure will become apparent in the following description, or are understood by the practice of the present disclosure.

BRIEF DESCRIPTION OF THE DRAWINGS

The above and/or additional aspects and advantages of the present disclosure will become apparent and readily understood from the description of embodiments in conjunction with the following drawings, in which.

Figure 1:
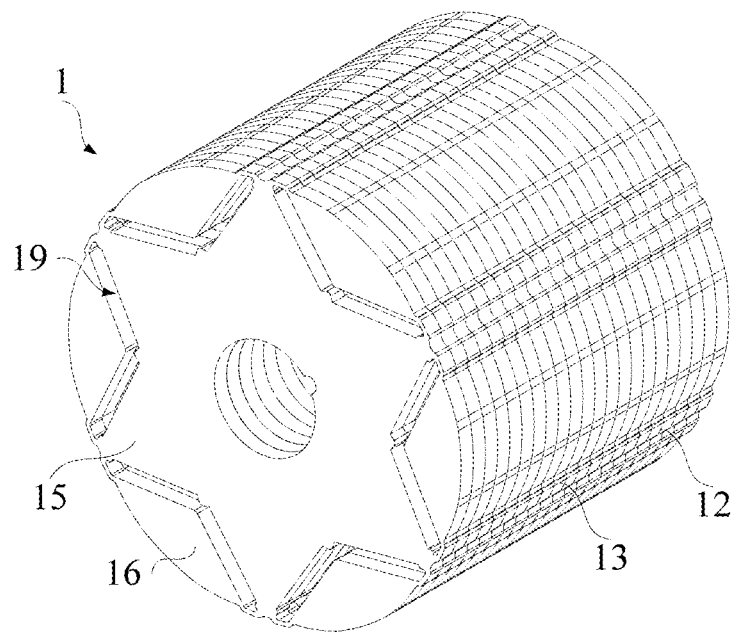
FIG. 1 shows a structural schematic diagram of a rotor core of a rotor according to an embodiment of the present disclosure.
Figure 2:
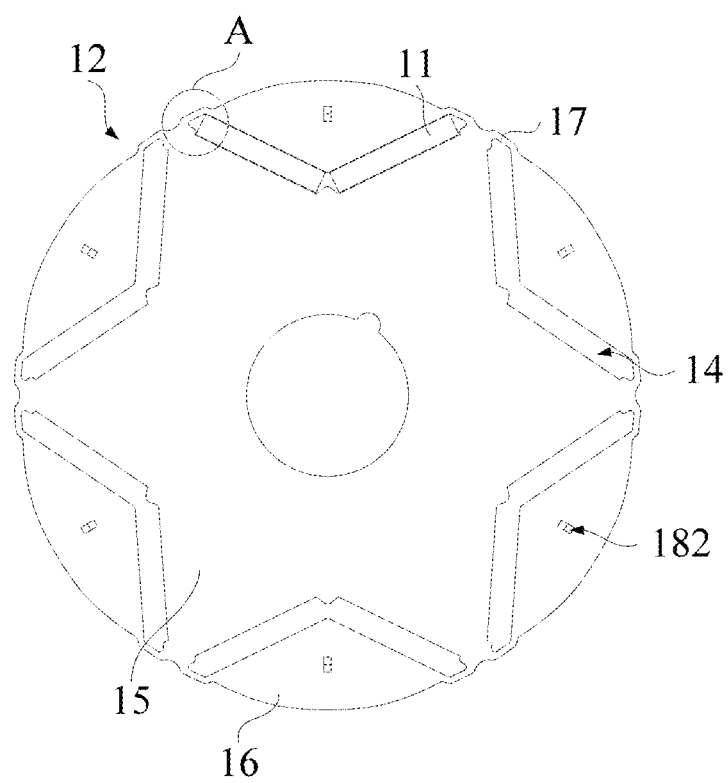
FIG. 2 shows a structural schematic diagram of first punches of a rotor according to an embodiment of the present disclosure.
Figure 3:
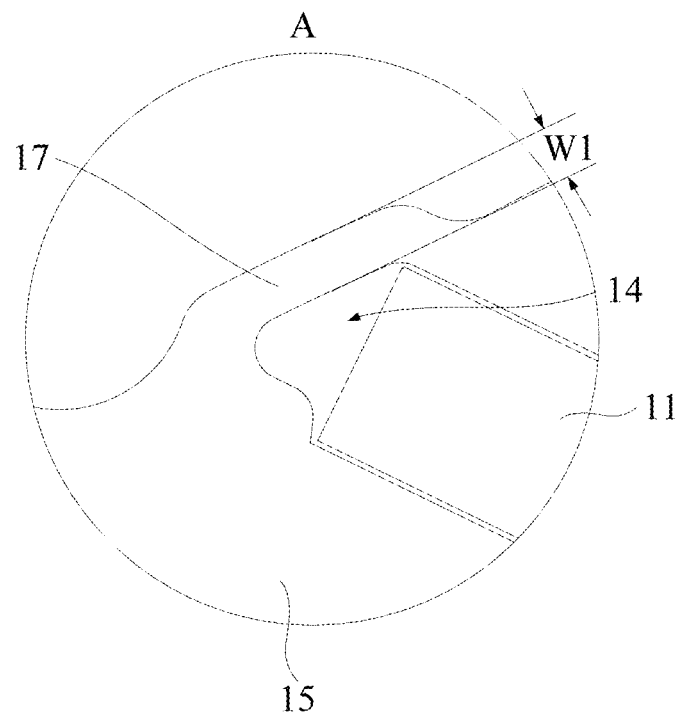
FIG. 3 shows a partial enlarged view of first punches at A according to an embodiment of the present disclosure shown in FIG. 2.
Figure 4:
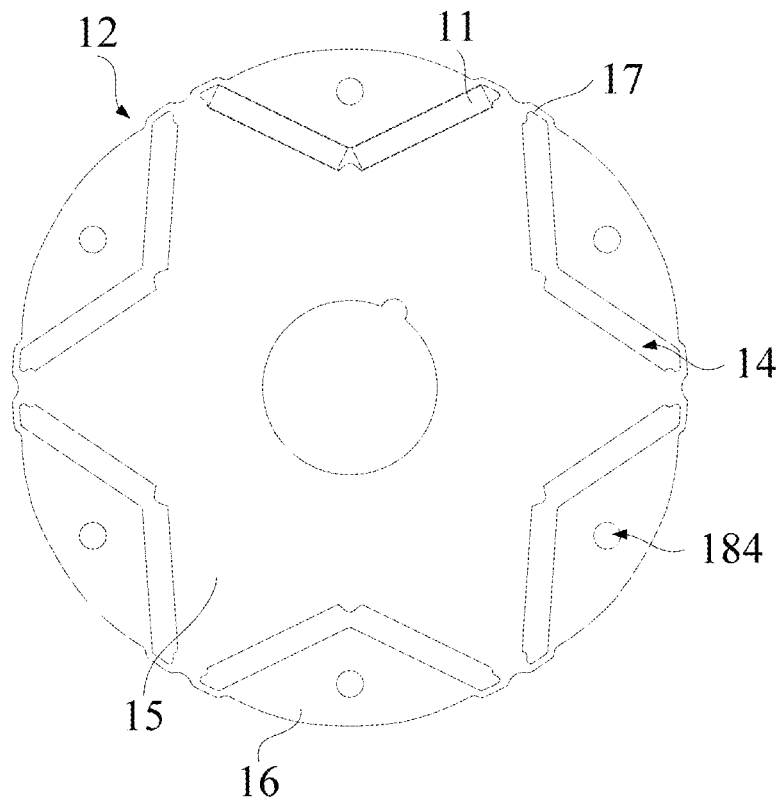
FIG. 4 shows a structural schematic diagram of first punches of a rotor according to another embodiment of the present disclosure.
Figure 5:
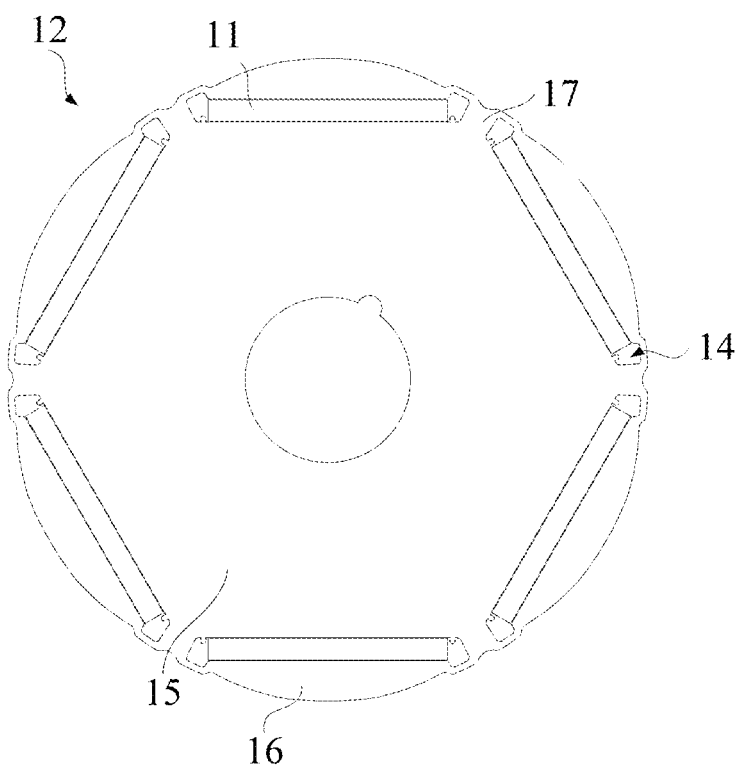
FIG. 5 shows a structural schematic diagram of first punches of a rotor according to a further embodiment of the present disclosure.
Figure 6:
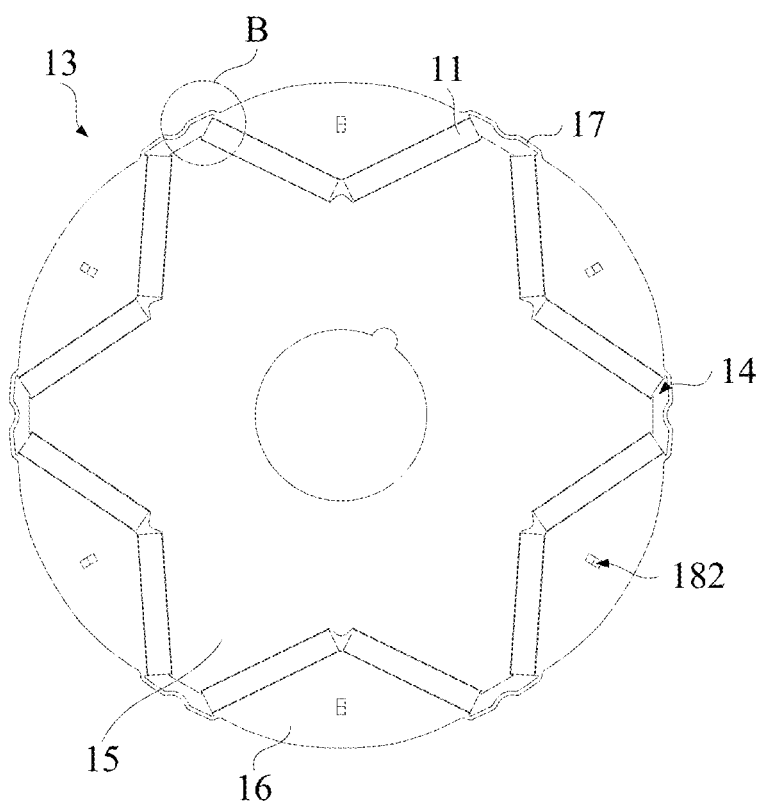
FIG. 6 shows a structural schematic diagram of second punches of a rotor according to an embodiment of the present disclosure.
Figure 7:
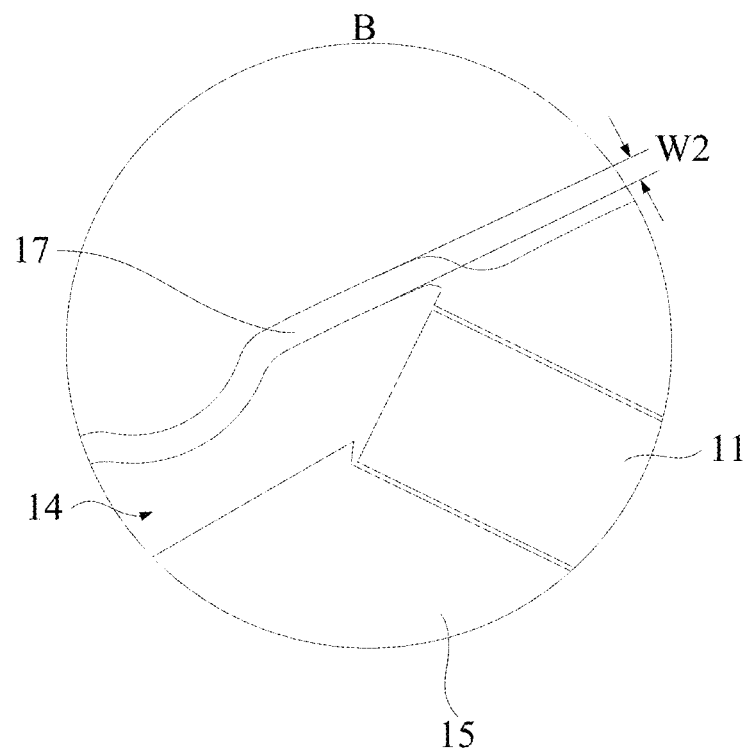
FIG. 7 shows a partial enlarged view of second punches at B according to an embodiment of the present disclosure shown in FIG. 6.
Figure 8:
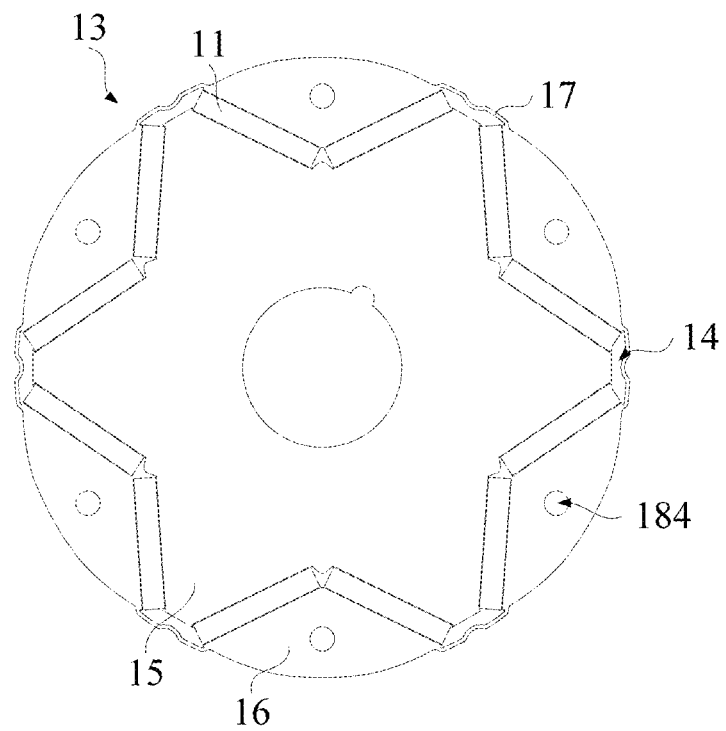
FIG. 8 shows a structural schematic diagram of second punches of a rotor according to a further embodiment of the present disclosure.
Figure 9:
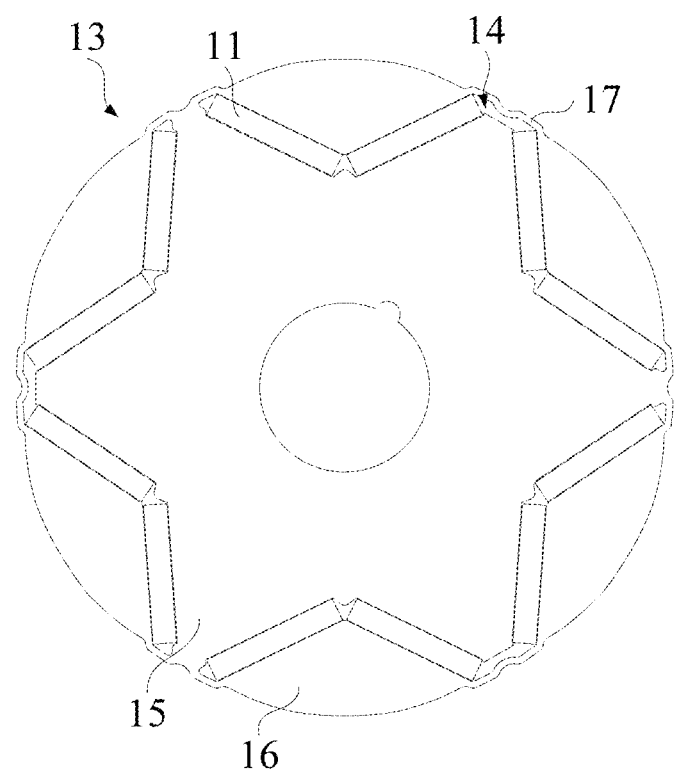
FIG. 9 shows a structural schematic diagram of second punches of a rotor according to a further embodiment of the present disclosure.
Figure 10:
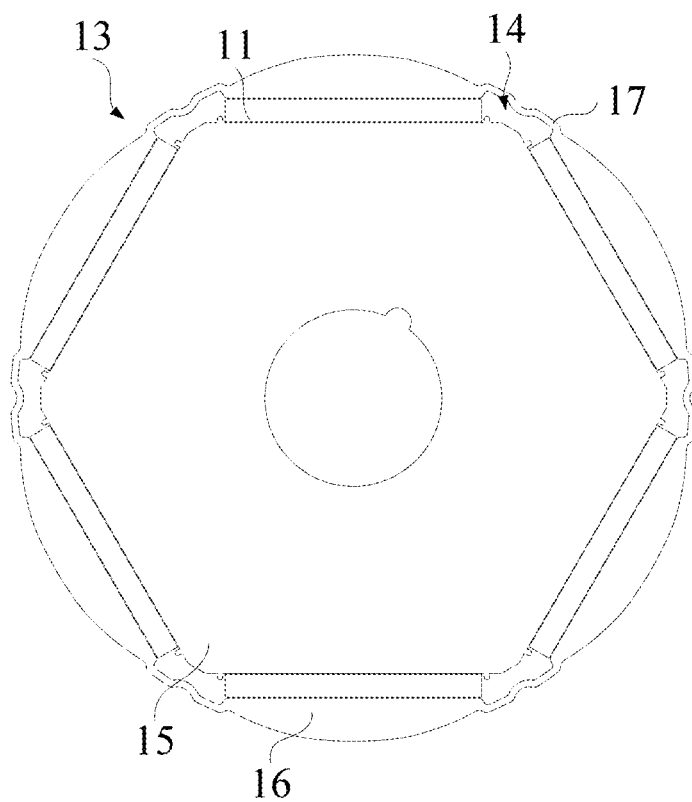
FIG. 10 shows a structural schematic diagram of second punches of a rotor according to a further embodiment of the present disclosure.
Figure 11:
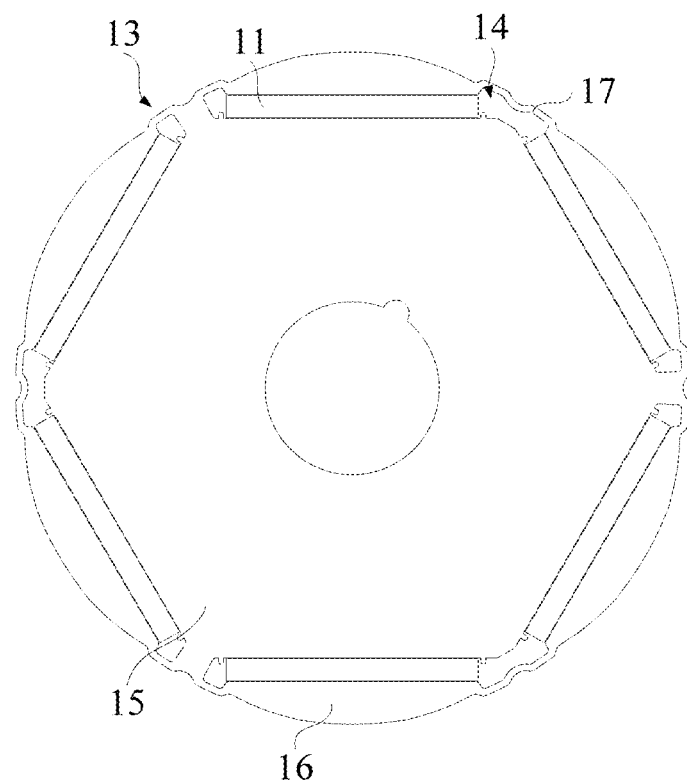
FIG. 11 shows a structural schematic diagram of second punches of a rotor according to a further embodiment of the present disclosure.
Figure 12:
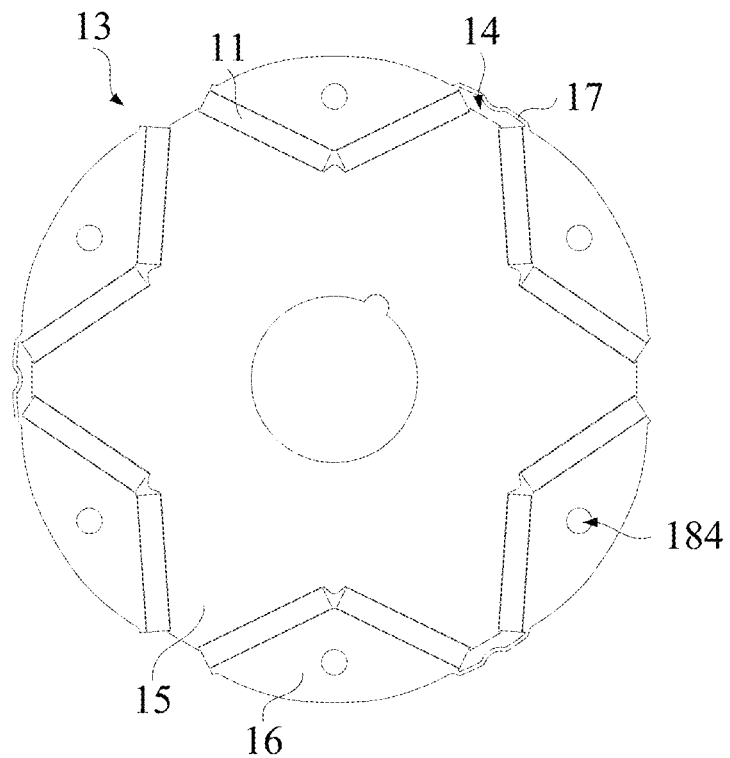
FIG. 12 shows a structural schematic diagram of second punches of a rotor according to a further embodiment of the present disclosure.

The corresponding relationship between the reference signs and component names in FIGS. 1-26 is as follows:

1 rotor core, 11 magnets, 12 first punches, 122 first sub-punches, 124 second sub-punches, 13 second punches, 14 openings, 15 rotor yoke, 16 pole caps, 17 connecting ribs, 182 rivet buckle, 184 rivet hole, 19 slot, 2 electric motor, 3 compressor.

DETAILED DESCRIPTION OF THE DISCLOSURE

In order that the above-mentioned objectives, features and advantages of the present disclosure can be understood more clearly, a further detailed description of the present disclosure will be given below in connection with the accompanying drawings and specific embodiments.

The following describes a rotor, an electric motor and a compressor according to some embodiments of the present disclosure with reference to FIGS. 1 to 26.

According to the first aspect of the present disclosure, a rotor is provided for electric motor 2, the rotor comprises: a plurality of first punches 12 and a plurality of second punches 13 stacked to form a rotor core 1; a plurality of openings 14 provided on each of the plurality of first punches 12 and the plurality of second punches 13 along a circumferential direction of the rotor core 1, the plurality of openings 14 dividing the plurality of first punches 12 and the plurality of second punches 13 into a rotor yoke 15 and a plurality of pole caps 16, the plurality of pole caps 16 arranged around the outer circumference of the rotor yoke 15, the plurality of openings 14 penetrating or extending in an axial direction of the rotor core 1 to form a plurality of slots 19;

and a plurality of magnets 11 arranged in the plurality of slots 19 in a one-to-one correspondence. Each of the plurality of first punches 12 includes at least one connecting rib 17, any one of the at least one connecting rib 17 is disposed between adjacent two of the plurality of pole caps 16, and at least two of the plurality of openings 14 of each of the plurality of second punches 13 communicate with each other.

As shown in FIGS. 1 to 14, the rotor provided by the present disclosure comprises a plurality of first punches 12, a plurality of second punches 13, a plurality of openings 14, and a plurality of magnets 11, the plurality of first punches 12 and the plurality of second punches 13 are stacked to form a rotor core 1; the plurality of openings 14 are provided on each of the plurality of first punches 12 and the plurality of second punches 13 along a circumferential direction, the plurality of openings 14 dividing the plurality of first punches 12 and the plurality of second punches 13 into a rotor yoke 15 and a plurality of pole caps 16, the plurality of pole caps 16 are arranged around the outer circumference of the rotor yoke 15, the plurality of openings 14 penetrate or extend in the axial direction of the rotor core 1 to form a plurality of slots 19; and the plurality of magnets 11 are arranged in the plurality of slots 19 in a one-to-one correspondence. Optionally, the magnets 11 are in the shape of sheet or arc, and the magnets 11 are matched with the slots 19, each of the plurality of first punches 12 includes at least one connecting rib 17, any one of the at least one connecting rib 17 is disposed between adjacent two of the plurality of pole caps 16, optionally, the connecting rib 17 is connected with rotor yoke 15, and at least two of the plurality of openings 14 of each of the plurality of second punches 13 communicate with each other. In addition, the magnets 11 of different polarities in the plurality of magnets 11 are alternately arranged in the openings 14. The first punches 12 with connecting ribs 17 provided by the present disclosure have higher mechanical strength, thereby avoiding the deformation of the rotor core 1 during high-speed rotation and affecting the performance of the electric motor 2. By connecting at least two openings 14 in the plurality of openings 14 on each of second punches 13, the magnets 11 of different polarities are connected through the connected openings 14, which effectively reduces the rotor magnetic leakage, improves the air gap magnetic density amplitude, reduces copper consumption, and improves the performance of the electric motor 2.

According to the second aspect of the present disclosure, a rotor is provided for electric motor 2, the rotor comprises: a plurality of first punches 12 and a plurality of second punches 13, the plurality of first punches 12 and the plurality of second punches 13 are stacked to form a rotor core 1; the plurality of openings 14 are provided on each of the plurality of first punches 12 and the plurality of second punches 13 along a circumferential direction, the plurality of openings 14 dividing the plurality of first punches 12 and the plurality of second punches 13 into a rotor yoke 15 and a plurality of pole caps 16, the plurality of pole caps 16 are arranged around the outer circumference of the rotor yoke 15, the plurality of openings 14 penetrate or extend in the axial direction of the rotor core 1 to form a plurality of slots 19; and the plurality of magnets 11 are arranged in the plurality of slots 19 in a one-to-one correspondence. Each of the plurality of first punches 12 includes at least one connecting rib 17, any one of the at least one connecting rib 17 is disposed between adjacent two of the plurality of pole caps 16, the plurality of openings 14 of the first punches 12 are not communicated with each other, and at least two of the plurality of openings 14 of each of the plurality of second punches 13 communicate with each other.

As shown in FIGS. 1 to 14, the rotor provided by the present disclosure comprises a plurality of first punches 12, a plurality of second punches 13, a plurality of openings 14, and a plurality of magnets 11, the plurality of first punches 12 and the plurality of second punches 13 are stacked to form a rotor core 1; the plurality of openings 14 are provided on each of the plurality of first punches 12 and the plurality of second punches 13 along a circumferential direction, the plurality of openings 14 dividing the plurality of first punches 12 and the plurality of second punches 13 into a rotor yoke 15 and a plurality of pole caps 16, the plurality of pole caps 16 are arranged around the outer circumference of the rotor yoke 15, the plurality of openings 14 penetrate or extend in the axial direction of the rotor core 1 to form a plurality of slots 19; and the plurality of magnets 11 are arranged in the plurality of slots 19 in a one-to-one correspondence. Optionally, the magnets 11 are in the shape of sheet or arc, and the magnets 11 are matched with the slots 19, each of the plurality of first punches 12 includes at least one connecting rib 17, any one of the at least one connecting rib 17 is disposed between adjacent two of the plurality of pole caps 16, optionally, the connecting rib 17 is connected with rotor yoke 15, and a plurality of openings 14 of first punches 12 are not connected to each other, and at least two of the plurality of openings 14 of each of the plurality of second punches 13 communicate with each other. In addition, the magnets 11 of different polarities in the plurality of magnets 11 are alternately arranged in the openings 14. The first punches 12 with connecting ribs 17 provided by the present disclosure have higher mechanical strength, thereby avoiding the deformation of the rotor core 1 during high-speed rotation and affecting the performance of the electric motor 2. By connecting at least two openings 14 in the plurality of openings 14 on each of second punches 13, the magnets 11 of different polarities are connected through the connected openings 14, which effectively reduces the rotor magnetic leakage, improves the air gap magnetic density amplitude, reduces copper consumption, and improves the performance of the electric motor 2.

In an embodiment of the present disclosure, optionally, a minimum radial thickness of the connecting rib 17 of the first punches 12 is W1, each of the plurality of second punches 13 includes at least one connecting rib 17, any one of the at least one connecting rib 17 is disposed between adjacent two of the plurality of pole caps 16, and a minimum radial thickness of the connecting rib 17 of the second punches 13 is W2, and it satisfies $0.2 \leq W2/W1 \leq 2$.

As shown in FIGS. 2 to 7, in this embodiment, a minimum radial thickness of the connecting rib 17 of the first punches 12 is W1, each of the plurality of second punches 13 includes at least one connecting rib 17, any one of the at least one connecting rib 17 is disposed between adjacent two of the plurality of pole caps 16, and a minimum radial thickness of the connecting rib 17 of the second punches 13 is W2. By limiting $0.2 \leq W2/W1 \leq 2$, the mechanical strength of the rotor core 1 is ensured under the premise of good electric motor 2 running performance and the rotor core 1 can be prevented from deforming during high-speed rotation. Optionally, $W2/W1=0.6$, at this time, the back EMF is higher, the efficiency improvements of electric motor 2 is better, the cost is reduced to a certain extent, and the mechanical strength is better. When $W2/W1<0.2$, the mechanical strength of the rotor core 1 is low, easy to deform, and the reliability of the electric motor 2 is poor; when $W2/W1>2$, the back EMF effect is not obvious, and the efficiency improvements of the electric motor 2 is not obvious.

Figure 29:
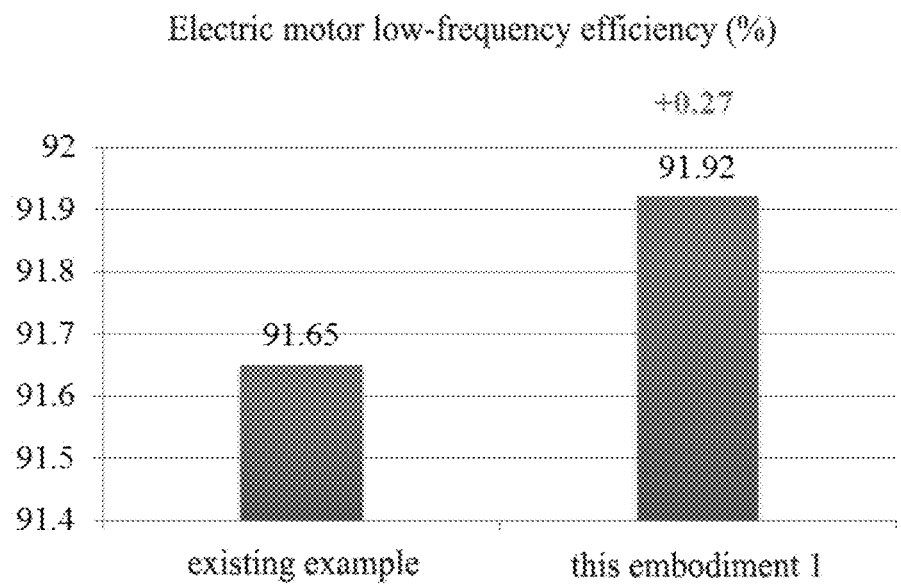
FIG. 29 shows an electric motor low-frequency efficiency comparison diagram of an embodiment of the present disclosure and an embodiment of the related art.
Figure 30:
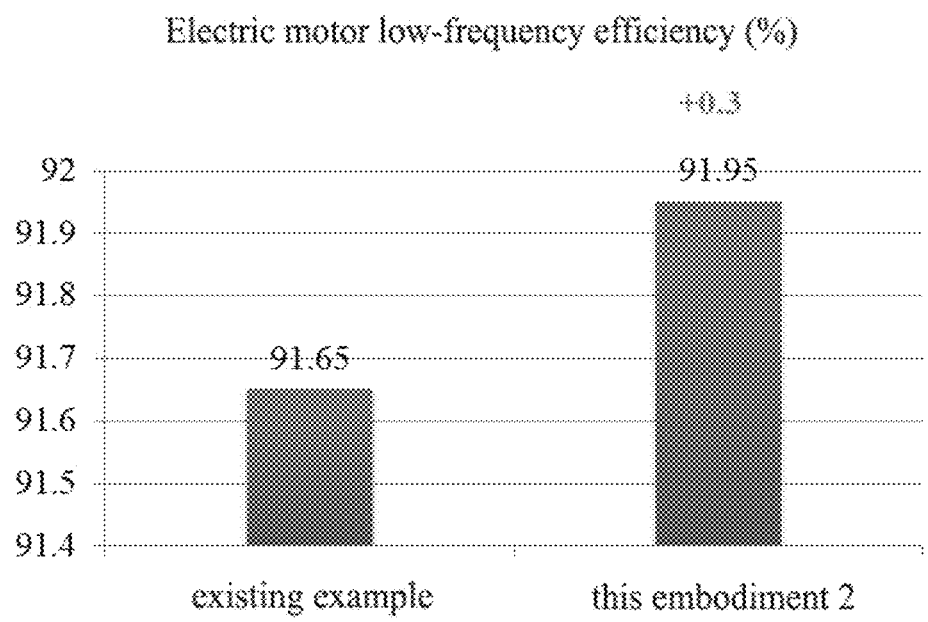
FIG. 30 shows an electric motor low-frequency efficiency comparison diagram of another embodiment of the present disclosure and an embodiment of the related art.
Figure 31:
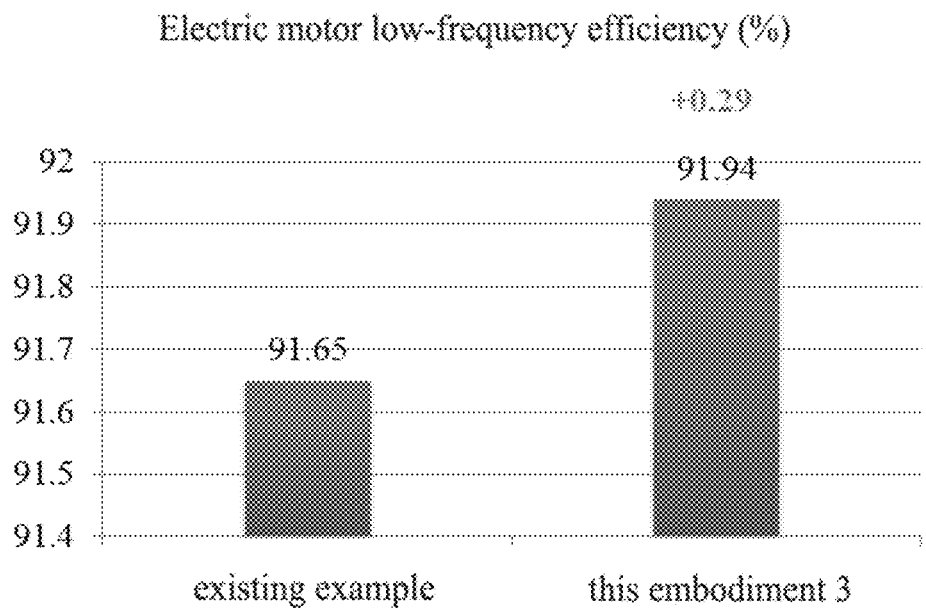
FIG. 31 shows an electric motor low-frequency efficiency comparison diagram of a further embodiment of the present disclosure and an embodiment of the related art.
Figure 32:
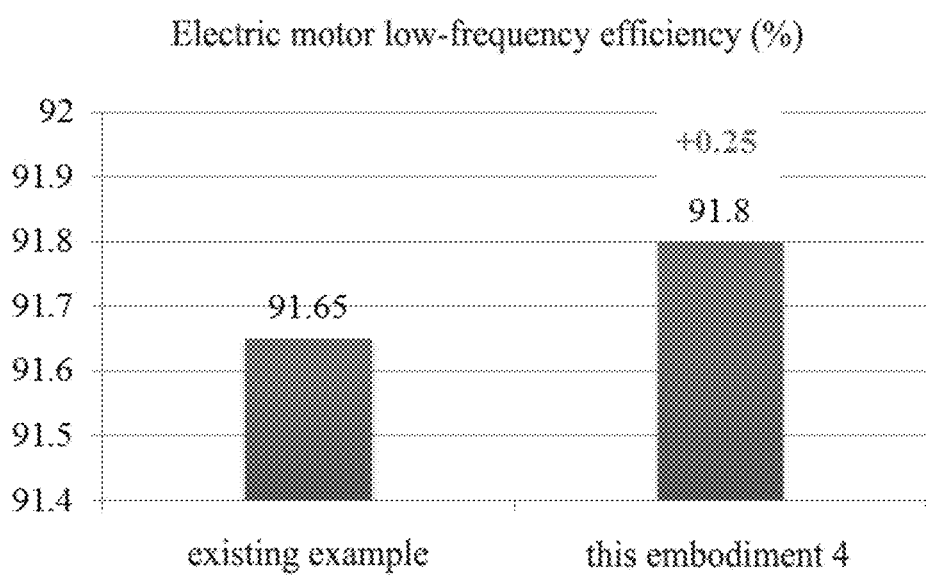
FIG. 32 shows an electric motor low-frequency efficiency comparison diagram of a further embodiment of the present disclosure and an embodiment of the related art.
Figure 33:
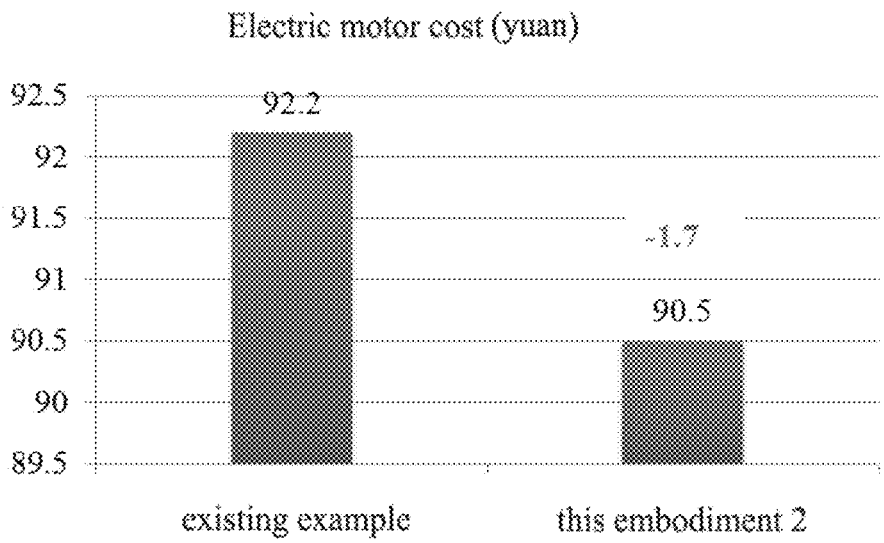
FIG. 33 shows a cost comparison chart of an embodiment of the present disclosure and an embodiment of the related art.
Figure 34:
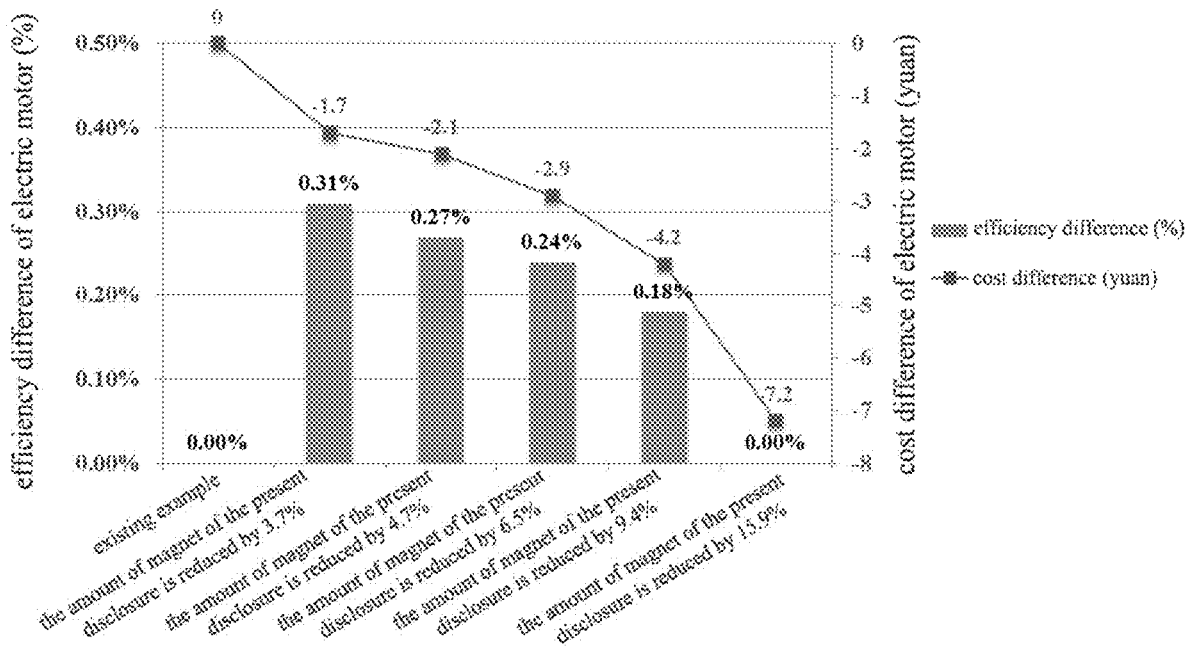
FIG. 34 shows an effect and cost comparison chart of an embodiment of the present disclosure and an embodiment of the related art.

FIG. 29 shows that when all the second punches 13 are used and $W2/W1=0.6$, the low-frequency efficiency of the electric motor in this embodiment 1 is increased by 0.27 compared to the existing example. FIG. 30 shows that when all the second punches 13 are used, the width of magnet 11 is reduced and $W2/W1=0.6$, the low-frequency efficiency of the electric motor in this embodiment 2 is increased by 0.3 compared with the existing example. FIG. 33 shows that when all the second punches 13 are used, the width of magnet 11 is reduced and $W2/W1=0.6$, and thus this embodiment 2 can effectively reduce the production cost of electric motor 2. FIG. 31 shows that when all the second punches 13 are used and $W2/W1=1$, the low-frequency efficiency of the electric motor in this embodiment 3 is increased by 0.29 compared to the existing example. FIG. 32 shows that when the second punches 13 are used for ⅔ of the axial length, the first punches 12 are used for ⅓ of the axial length, and $W2/W1=0.6$ in this embodiment 4, the low-frequency efficiency of the electric motor in this embodiment 4 is increased by 0.25 compared with the existing example. FIG. 34 shows a comparison diagram of the efficiency difference and cost difference between the embodiment of the present disclosure and the embodiment of the related technology, in which under the condition of not greatly affecting the efficiency of electric motor, the embodiment of the present disclosure can reduce the amount of magnet by 3.7% to 15.9% compared with the embodiment of the related technology. When the amount of magnet in the embodiment of the present disclosure is reduced by 3.7% compared with the related technology, the efficiency difference of electric motor is 0.31%, and the cost can be reduced by 1.7 yuan; when the amount of magnet in the embodiment of the present disclosure is reduced by 4.7% compared with the related technology, the efficiency difference of electric motor is 0.27%, and the cost can be reduced by 2.1 yuan; when the amount of magnet in the embodiment of the present disclosure is reduced by 6.5% compared with the related technology, the efficiency difference of electric motor is 0.24%, and the cost can be reduced by 2.9 yuan; when the amount of magnet in the embodiment of the present disclosure is reduced by 9.4% compared with the related technology, the efficiency difference of electric motor is 0.18%, and the cost can be reduced by 4.2 yuan; when the amount of magnet in the embodiment of the present disclosure is reduced by 15.9% compared to the related technology, there is no difference in the efficiency of the electric motor, and the cost can be reduced by 7.2 yuan.

In an embodiment of the present disclosure, optionally, adjacent two of the plurality of pole caps 16 in the second punches 13 are not connected to each other.

Figure 13:
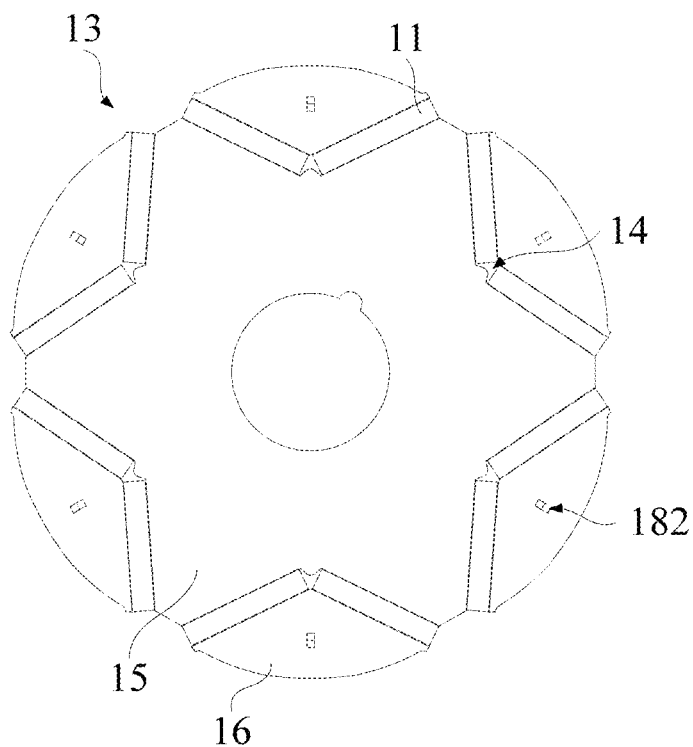
FIG. 13 shows a structural schematic diagram of second punches of a rotor according to a further embodiment of the present disclosure.
Figure 14:
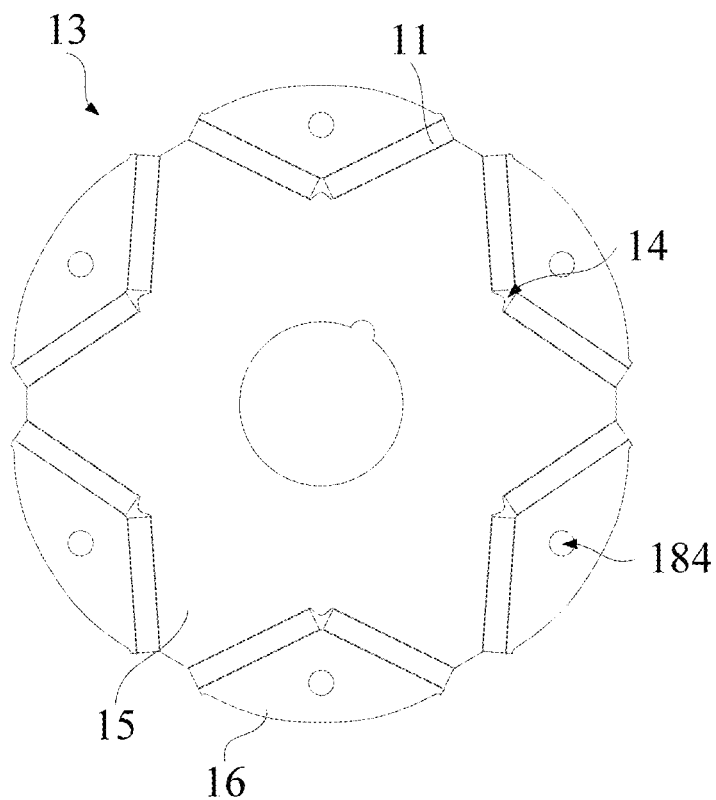
FIG. 14 shows a structural schematic diagram of second punches of a rotor according to a further embodiment of the present disclosure.
Figure 15:
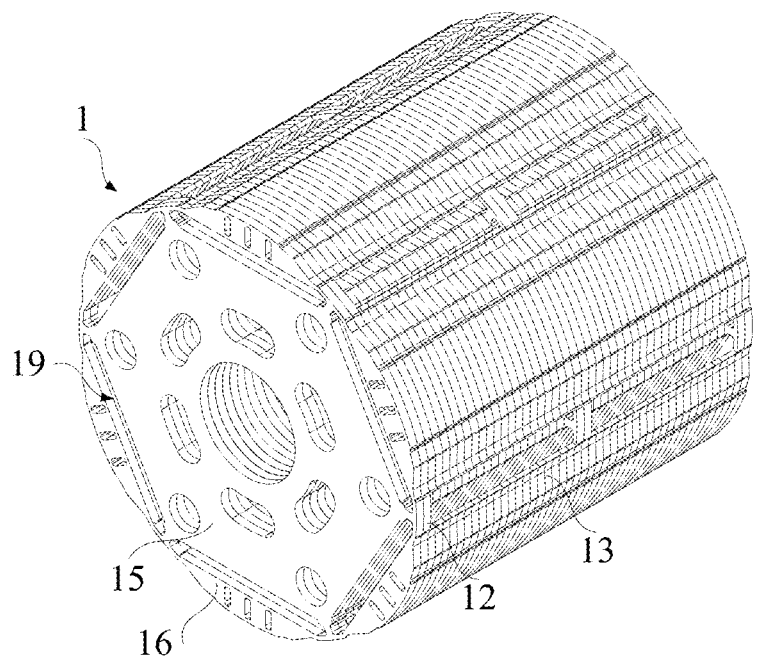
FIG. 15 shows a structural schematic diagram of a rotor core of a rotor according to another embodiment of the present disclosure.
Figure 16:
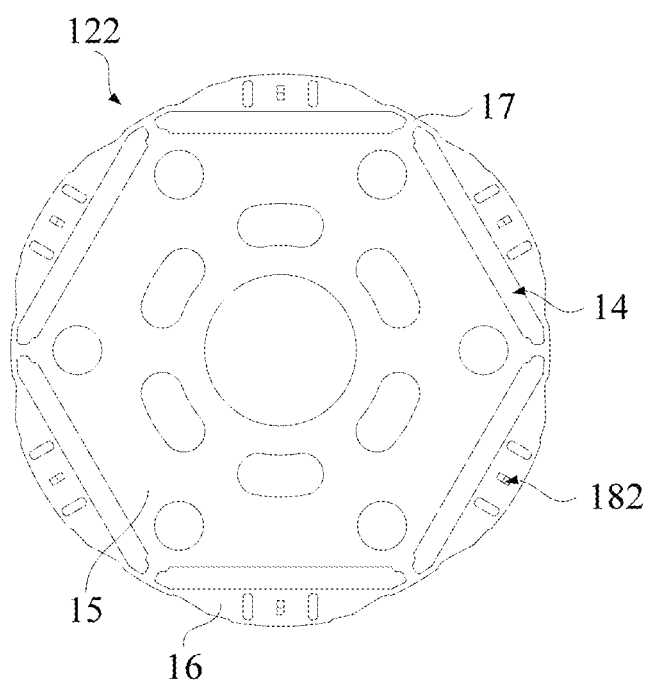
FIG. 16 shows a structural schematic diagram of first sub-punches of a rotor according to an embodiment of the present disclosure.
Figure 17:
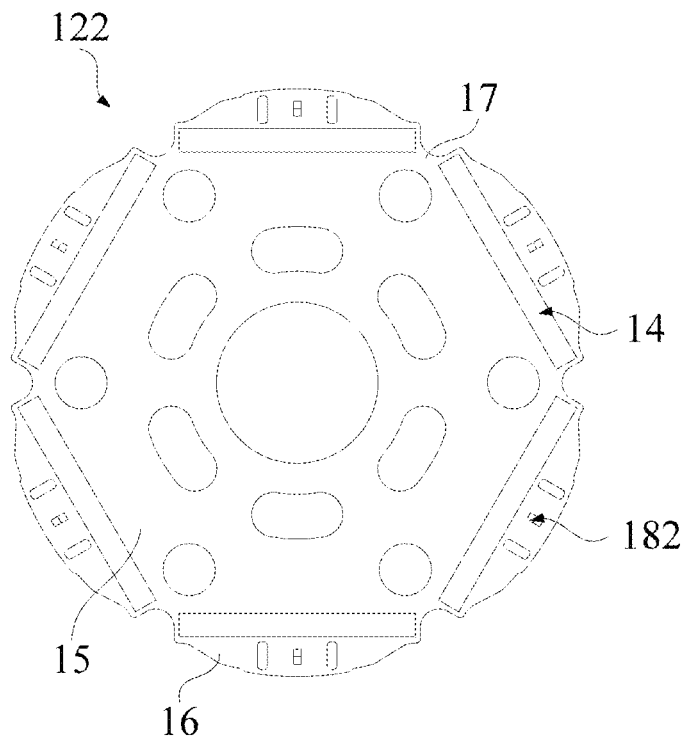
FIG. 17 shows a structural schematic diagram of first sub-punches of a rotor according to another embodiment of the present disclosure.
Figure 18:
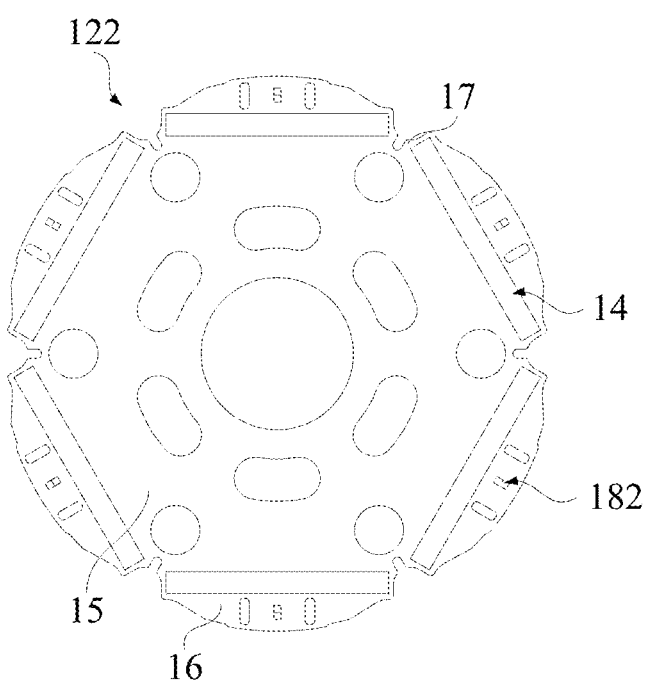
FIG. 18 shows a structural schematic diagram of first sub-punches of a rotor according to a further embodiment of the present disclosure.
Figure 19:
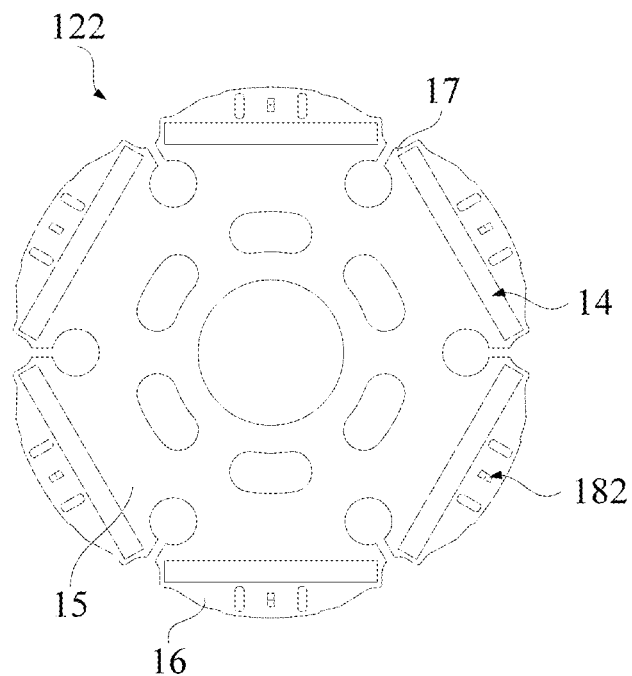
FIG. 19 shows a structural schematic diagram of first sub-punches of a rotor according to a further embodiment of the present disclosure.
Figure 20:
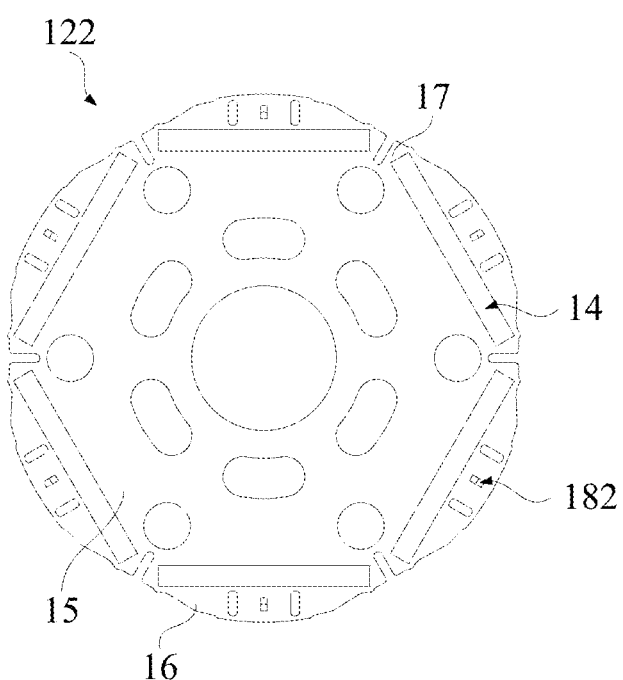
FIG. 20 shows a structural schematic diagram of first sub-punches of a rotor according to a further embodiment of the present disclosure.
Figure 21:
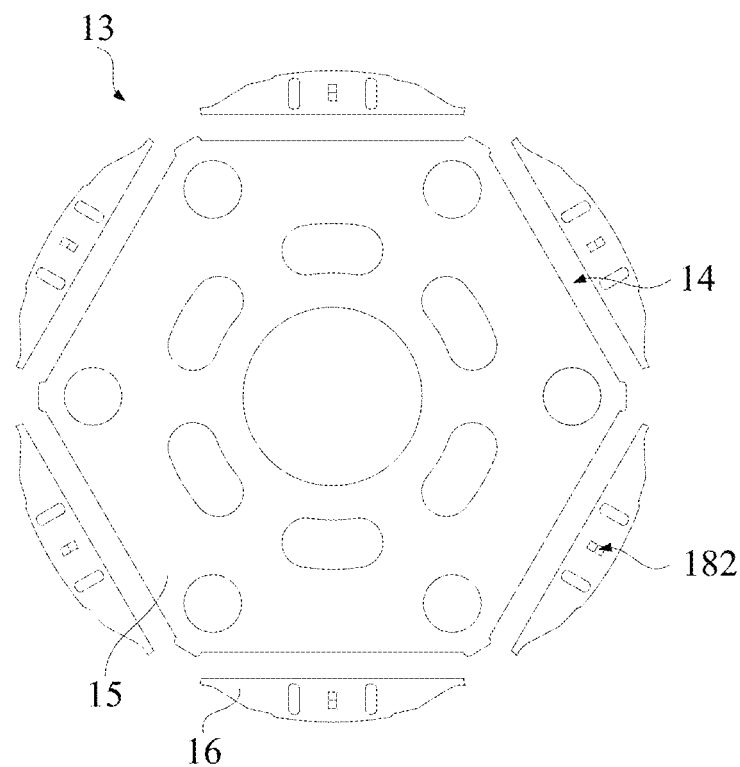
FIG. 21 shows a structural schematic diagram of second punches of a rotor according to an embodiment of the present disclosure.
Figure 22:
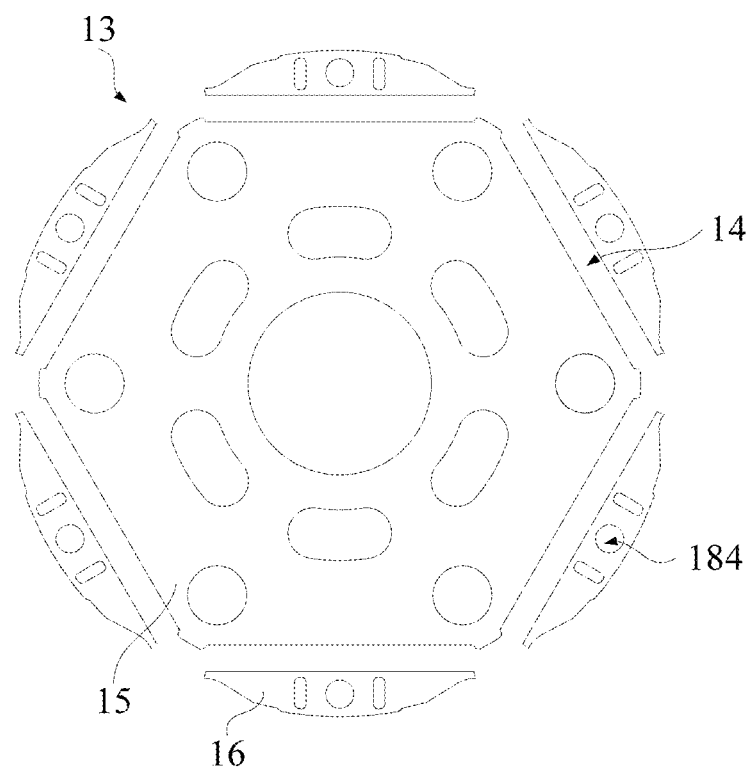
FIG. 22 shows a structural schematic diagram of second punches of a rotor according to another embodiment of the present disclosure.
Figure 23:
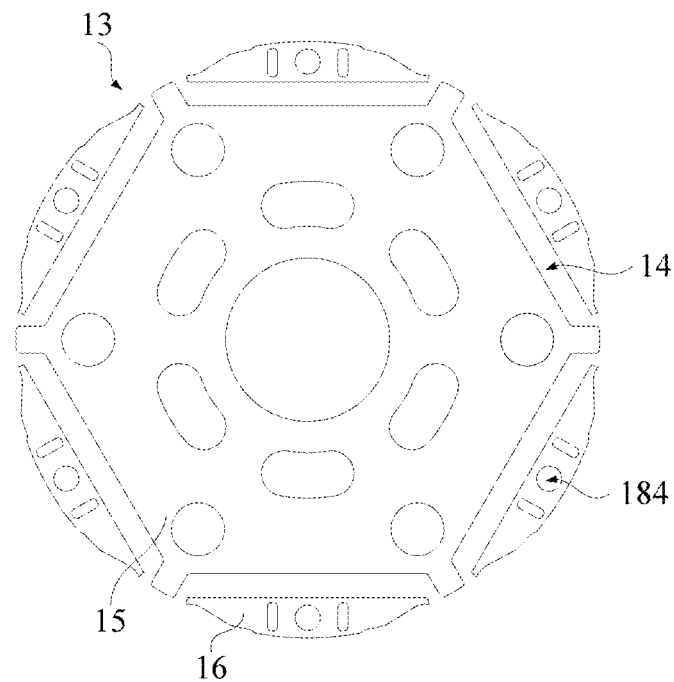
FIG. 23 shows a structural schematic diagram of second punches of a rotor according to a further embodiment of the present disclosure.
Figure 24:
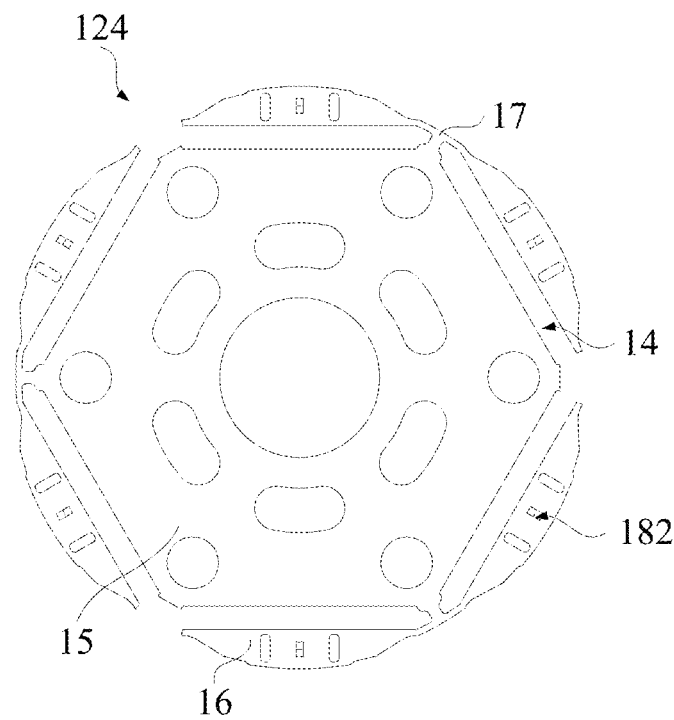
FIG. 24 shows a structural schematic diagram of second sub-punches of a rotor according to an embodiment of the present disclosure.
Figure 25:
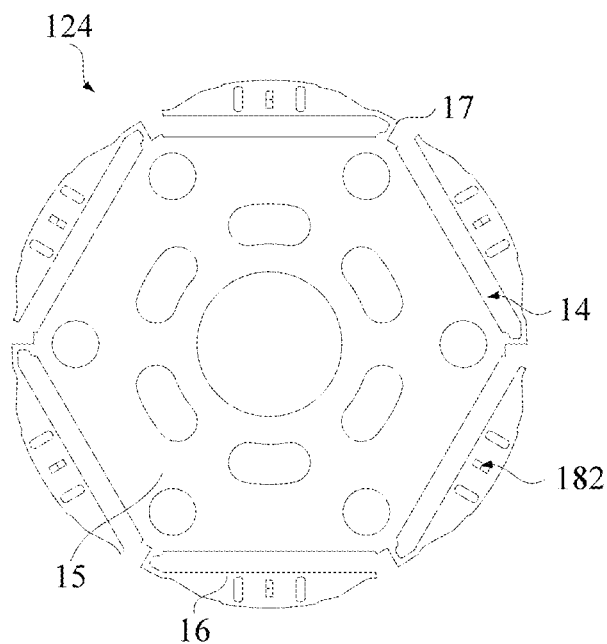
FIG. 25 shows a structural schematic diagram of second sub-punches of a rotor according to another embodiment of the present disclosure.

As shown in FIGS. 13 and 14, in this embodiment, adjacent two of the plurality of pole caps 16 in the second punches 13 are not connected to each other, that is, the second punches 13 do not have connecting ribs 17, which can effectively remove part of the magnetic bridge on the axis of the rotor core 1, reduce the strength of the armature reaction, and effectively improve the anti-demagnetization ability of the electric motor 2. The use of different structures of the first punches 12 and the second punches 13 can effectively reduce rotor magnetic leakage, increase the air gap magnetic density amplitude, reduce copper loss, and improve the performance of the electric motor 2.

According to the third aspect of the present disclosure, as shown in FIGS. 15 to 23, a rotor is proposed for electric motor 2, the rotor comprises: a plurality of first punches 12, a plurality of second punches 13, a plurality of openings 14, and a plurality of magnets, the plurality of first punches 12 and the plurality of second punches 13 are stacked to form a rotor core 1; the plurality of openings 14 are provided on each of the plurality of first punches 12 and the plurality of second punches 13 along a circumferential direction, the plurality of openings 14 dividing the plurality of first punches 12 and the plurality of second punches 13 into a rotor yoke 15 and a plurality of pole caps 16, the plurality of pole caps 16 are arranged around the outer circumference of the rotor yoke 15, the plurality of openings 14 penetrate or extend in the axial direction of the rotor core 1 to form a plurality of slots 19; and the plurality of magnets are arranged in the plurality of slots 19 in a one-to-one correspondence, wherein each of the plurality of first punches 12 includes at least one connecting rib 17, any one of the at least one connecting rib 17 is disposed between adjacent two of the plurality of pole caps 16, adjacent two of the plurality of pole caps 16 in the second punches 13 are not connected to each other.

Figure 27:
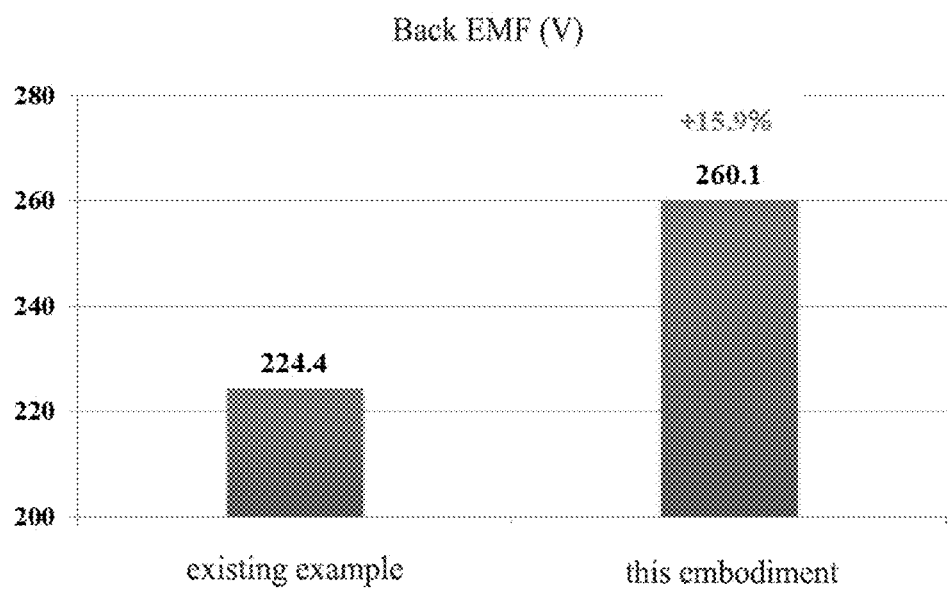
FIG. 27 shows a back EMF comparison diagram of an embodiment of the present disclosure and an embodiment of the related art.
Figure 28:
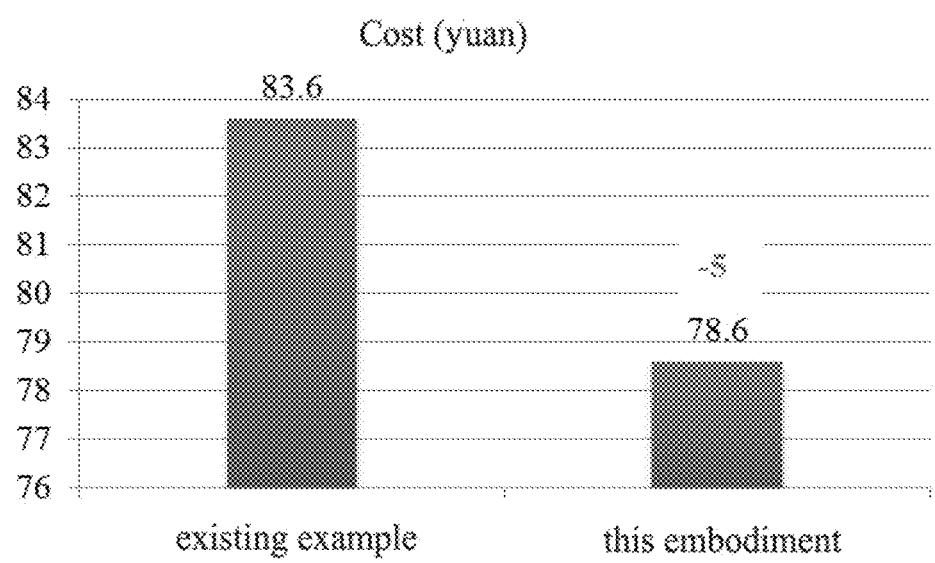
FIG. 28 shows a cost comparison chart of an embodiment of the present disclosure and an embodiment of the related art.

The rotor provided by the present disclosure comprises a plurality of first punches 12, a plurality of second punches 13, a plurality of openings 14, and a plurality of magnets, the plurality of first punches 12 and the plurality of second punches 13 are stacked to form a rotor core 1; the plurality of openings 14 are provided on each of the plurality of first punches 12 and the plurality of second punches 13 along a circumferential direction, the plurality of openings 14 dividing the plurality of first punches 12 and the plurality of second punches 13 into a rotor yoke 15 and a plurality of pole caps 16, the plurality of pole caps 16 are arranged around the outer circumference of the rotor yoke 15, the plurality of openings 14 penetrate or extend in the axial direction of the rotor core 1 to form a plurality of slots 19; and the plurality of magnets are arranged in the plurality of slots 19 in a one-to-one correspondence. Optionally, the magnets are in the shape of sheet or arc, and the magnets are matched with the slots 19, each of the plurality of first punches 12 includes at least one connecting rib 17, any one of the at least one connecting rib 17 is disposed between adjacent two of the plurality of pole caps 16, optionally, the connecting rib 17 is connected with rotor yoke 15, adjacent two of the plurality of pole caps 16 in the second punches 13 are not connected to each other, the rotor core 1 of the present disclosure is formed by stacking the first punches 12 that include at least one connecting rib 17 and the second punches 13 that do not have connecting ribs 17. The connecting ribs 17 can ensure the mechanical strength of the first punches 12 and prevent the rotor core 1 from deforming during high-speed rotation and affecting the performance of the electric motor 2. Since the adjacent two of the plurality of pole caps 16 of the second punches 13 are not connected to each other, that is, the second punches 13 do not have connecting ribs 17, can effectively remove part of the magnetic bridge in the axial direction of the rotor core 1, reduce the strength of the armature reaction, and effectively improve the anti-demagnetization ability of the electric motor 2. In the present disclosure, the use of different structures of the first punches 12 and the second punches 13 can effectively reduce rotor magnetic leakage, increase the air gap magnetic density amplitude, reduce copper loss, and improve the performance of the electric motor 2. As shown in FIGS. 27 and 28, the present disclosure can increase the back EMF of the rotor and reduce the production cost of the motor 2. In an embodiment of the present disclosure, optionally, the plurality of first punches 12 includes a plurality of first sub-punches 122 and a plurality of second sub-punches 124, and the connecting rib 17 is provided between each adjacent two of the plurality of pole caps 16 of each of the plurality of first sub-punches 122, each of the plurality of pole caps 16 of each of the plurality of second sub-punches 124 is a first pole cap, and one end of the first pole cap is connected to adjacent pole cap 16 through the connecting rib 17, and the other end of the first pole cap is not connected to the adjacent pole cap 16, the second punches 13 are sandwiched between the first sub-punches 122; and/or the second sub-punches 124 are sandwiched between the first sub-punches 122; and/or the second punches 13 are sandwiched between the second sub-punches 124.

As shown in FIGS. 2, 4, and 16-25, in this embodiment, the plurality of first punches 12 includes a plurality of first sub-punches 122 and a plurality of second sub-punches 124. The connecting rib 17 is provided between each adjacent two of the plurality of pole caps 16 of each of the plurality of first sub-punches 122, that is, the every two pole caps 16 on the first sub-punches 122 are connected by connecting ribs 17 to ensure the mechanical strength of the first punches 12 and avoid the deformation of the rotor core 1 during high-speed rotation and affect the performance of the electric motor 2. Each of the plurality of pole caps 16 of each of the plurality of second sub-punches 124 is a first pole cap, and one end of the first pole cap is connected to adjacent pole cap 16 through the connecting rib 17, and the other end of the first pole cap is not connected to the adjacent pole cap 16, that is, the second sub-punches 124 are provided with connecting ribs 17 at intervals, and some pole caps 16 are connected by connecting ribs 17, and the other pole caps 16 are not connected to each other. That is, the second sub-punches 124 are provided with connecting ribs 17 at intervals, and part of pole caps 16 are connected by connecting ribs 17, and the other pole caps 16 are not connected to each other. Therefore, the second sub-punches 124 can ensure its own mechanical strength under the action of the connecting ribs 17, and prevent the rotor core 1 from deforming during high-speed rotation and affecting the performance of the electric motor 2; on the other hand, since part of the pole caps 16 on the second sub-punches 124 are not connected to each other, part of the magnetic bridge in the axial direction of the rotor core 1 can be effectively removed, which reduces the strength of the armature reaction and effectively improves the anti-demagnetization ability of the electric motor 2. In addition, the second punches 13 are sandwiched between the first sub-punches 122; and/or the second sub-punches 124 are sandwiched between the first sub-punches 122; and/or the second punches 13 are sandwiched between the second sub-punches 124. That is, the rotor core 1 is formed by stacking the first sub-punches 122, the second sub-punches 124 and the second punches 13 of different structures, and the stacking methods of the first sub-punches 122, the second sub-punches 124 and the second punches 13 are diversified, thereby effectively reducing rotor magnetic leakage, increasing the air gap magnetic density amplitude, reducing copper loss, and improving the performance of the electric motor 2.

In an embodiment of the present disclosure, optionally, projections of the connecting rib 17 of the plurality of second sub-punches 124 and projections of the connecting rib 17 of the plurality of first sub-punches 122 on a plane perpendicular to the axial direction of the rotor core 1 completely overlap.

In this embodiment, projections of the connecting rib 17 of the plurality of second sub-punches 124 and projections of the connecting rib 17 of the plurality of first sub-punches 122 on a plane perpendicular to the axial direction of the rotor core 1 completely overlap, the plurality of second sub-punches 124 includes the first-type second sub-punches and the second-type second sub-punches, the sum of the projection of the connecting ribs 17 of the first-type second sub-punches and the second-type second sub-punches on the plane perpendicular to the axis of the rotor core 1, and the projection of the connecting ribs 17 of the first sub-punches 122 on the plan perpendicular to the axis of the rotor core 1 completely overlap. That is, the first-type second sub-punches and the second-type second sub-punches are misaligned and stacked, and the connecting ribs 17 of the first-type second sub-punches corresponds to the area stacking without connecting ribs 17 on the second-type second sub-punches. In addition, the second punches 13 are sandwiched between the first sub-punches 122, and/or the first-type second sub-punches are sandwiched between the first sub-punches 122, and/or the second-type second sub-punches are sandwiched between the first sub-punches 122, and/or the second punches 13 are sandwiched between the first-type second sub-punches, and/or the second punches 13 are sandwiched between the second-type second sub-punches. The rotor core 1 is formed by stacking different structures of the first sub-punches 122, the first-type second sub-punches, the second-type second sub-punches and the second punches 13. The stacking methods of the first sub-punches 122, the first-type second sub-punches, the second-type second sub-punches and the second punches 13 are diversified. Therefore, rotor magnetic leakage can be effectively reduced, the air gap magnetic density amplitude can be increased, copper loss can be reduced, and the performance of the electric motor 2 can be improved.

In an embodiment of the present disclosure, optionally, a stack thickness of the plurality of first sub-punches 122 is L1, and a sum of a stack thickness of the plurality of second punches 13 and the plurality of second sub-punches 124 is L, and it satisfies 0.0105(L1+L)≤L1≤0.1(L1+L).

In this embodiment, a stack thickness of the plurality of first sub-punches 122 is L1, and a sum of a stack thickness of the plurality of second punches 13 and the plurality of second sub-punches 124 is L, and it satisfies 0.0105(L1+L)≤L1≤0.1(L1+L). By limiting the sum of the stack thickness of the plurality of the first sub-punches 122 and the stack thickness of the second punches 13 and the second sub-punches 124, thereby the rotor magnetic leakage is reduced, the air gap magnetic density amplitude is increased, the copper loss is reduced, and the performance of the electric motor 2 is improved. In addition, since the adjacent two of the plurality of pole caps 16 in the second punches 13 are not connected to each other, the second punches 13 can effectively reduce the strength of the armature reaction, thereby improving the anti-demagnetization ability of the electric motor 2.

In an embodiment of the present disclosure, optionally, when the magnet 11 is a radially magnetized magnet, rivet holes 184 or rivet buckles 182 are provided on each of the plurality of pole caps 16 of the first punches 12 and the second punches 13, so that the plurality of first punches 12 and the plurality of second punches 13 are connected.

As shown in FIGS. 16 to 25, in this embodiment, when the magnet 11 adopts the radial magnetization method, the rivet holes 184 or the rivet buckles 182 are provided on each of the plurality of pole caps 16 of the first punches 12 and the second punches 13, and the plurality of first punches 12 and the plurality of second punches 13 can be connected by the rivet buckles 182 arranged on each pole cap 16, or by screwing the rivets into the rivet holes 184 on each pole cap 16 of the plurality of first punches 12 and the plurality of second punches 13, so that the plurality of first punches 12 and the plurality of second punches 13 are connected. Of course, the plurality of first punches 12 and the plurality of second punches 13 can also be connected by other fixing structures, as long as they do not deviate from the design concept of the present disclosure, and they all fall within the protection scope of the present disclosure.

In an embodiment of the present disclosure, optionally, when the magnet 11 is a tangentially magnetized magnet, rivet holes 184 or rivet buckles 182 are provided on each of the plurality of pole caps 16 of the first punches 12 and the second punches 13, and the rivet holes 184 or the rivet buckles 182 are located between two magnets 11 of same polarity in the plurality of magnets 11.

As shown in FIGS. 2 to 25, in this embodiment, when the magnet 11 adopts the tangential magnetization method, the rivet holes 184 or the rivet buckles 182 are provided on each of the plurality of pole caps 16 of the first punches 12 and the second punches 13, and the rivet holes 184 or the rivet buckles 182 are located between two magnets 11 of the same polarity in the plurality of magnets 11, the plurality of first punches 12 and the plurality of second punches 13 can be connected by the rivet buckles 182 arranged on each pole cap 16, or by screwing the rivets into the rivet holes 184 on each pole cap 16 of the plurality of first punches 12 and the plurality of second punches 13, so that the plurality of first punches 12 and the plurality of second punches 13 are connected. Of course, the plurality of first punches 12 and the plurality of second punches 13 can also be connected by other fixing structures, as long as they do not deviate from the design concept of the present disclosure, they all fall within the protection scope of the present disclosure.

In an embodiment of the present disclosure, optionally, the rivet holes 184 are round, triangular, hexagonal; and/or the rivet buckles 182 are rectangular or round.

In this embodiment, the rivet holes 184 are round, triangular, hexagonal or other shapes; and/or the rivet buckles 182 are rectangular, round or other shapes, which can be provided on the pole caps 16 according to actual needs, effectively improving the flexibility of installation and connection between the first punches 12 and the second punches 13.

In an embodiment of the present disclosure, optionally, the magnet 11 is a straight magnet or a V-shaped magnet; and/or the magnet 11 is a rare earth magnet, a ferrite magnet or a rare earth and ferrite mixed magnet.

As shown in FIGS. 1 to 25, in this embodiment, the magnet 11 is a straight magnet or a V-shaped magnet or other shapes of magnet. For example, the magnet 11 can be a hybrid structure of radial and tangential, and the slot 19 is matched with the magnet 11; and/or the magnet 11 is a rare earth magnet, a ferrite magnet, or a rare earth and ferrite mixed magnet, wherein the magnet 11 can also have other shapes, and the magnet 11 can also be made of other materials, as long as they meet the design concept of the present disclosure, they all fall within the protection scope of the present disclosure.

According to the fourth aspect of the present disclosure, an electric motor 2 is provided, the electric motor 2 comprises the rotor as described in any of the above-mentioned embodiments, and therefore has all the beneficial effects of the rotor, and will not be repeated here.

In an embodiment of the present disclosure, the electric motor 2 further comprising: a stator body is arranged around an outside of the rotor; wherein a rated torque of the electric motor 2 is T, an inner diameter of the stator body is Di, and a torque per unit volume of the rotor is TPV, and it satisfies $5.18 \times 10^{-7} \leq T \times Di^{-3} \times TPV^{-1} \leq 1.17 \times 10^{-6}$, $5 \text{ kN·m·m}^{-3} \leq TPV \leq 45 \text{ kN·m·m}^{-3}$, the unit of rated torque T is N·m, the unit of inner diameter Di is mm, and the unit of torque per unit volume TPV is $kN·m·m^{-3}$.

In this embodiment, the electric motor 2 further comprising: a stator body is arranged around an outside of the rotor; wherein a rated torque of the electric motor 2 is T, an inner diameter of the stator body is Di, and a torque per unit volume of the rotor is TPV, and it satisfies $5.18 \times 10^{-7} T \times Di^{-3} \times TPV^{-1} \leq 1.17 \times 10^{-6}$, the value range of the torque per unit volume TPV is $5 \text{ kN·m·m}^{-3} \leq TPV \leq 45 \text{ kN·m·m}^{-3}$. By limiting the value range of the combined variable of the rated torque T of the electric motor 2, the inner diameter Di of the stator body and the torque per unit volume TPV of the rotor, the electric motor 2 can meet the power demand of the compressor 3. In addition, for the electric motor 2 and the compressor 3 using the rotor, it can effectively reduce rotor magnetic leakage, increase the utilization of permanent magnets 11, and improve the efficiency of electric motor 2.

In an embodiment of the present disclosure, optionally, the stator body further includes a plurality of stator protruding teeth and a plurality of stator slots, the plurality of stator protruding teeth are arranged on an inner side wall of the stator body facing the rotor, and each of the plurality of stator slots is provided between adjacent two of the plurality of stator protruding teeth, a coil is straddled one of the stator protruding teeth and located in the stator slot; the number of the stator slots is Z, and the number of pole pairs of the rotor is P, and it satisfies Z/2P=3/2 or 6/5 or 6/7 or 9/8 or 9/10.

In this embodiment, the stator body further includes a plurality of stator protruding teeth and a plurality of stator slots, the plurality of stator protruding teeth are arranged on an inner side wall of the stator body facing the rotor, and each of the plurality of stator slots is provided between adjacent two of the plurality of stator protruding teeth. When the number of the stator protruding teeth that a coil crosses is one, that is, the coil crosses a stator protruding tooth and is located in the stator slot, limiting the proportional relationship between the number Z of the stator slots and the number of the pole pairs P of the rotor, and then limiting the pole groove fit of the electric motor 2. When the number of the pole pairs of the rotor is P, the number of the poles of the rotor is 2P, that is, the electric motor 2 can be a 6-pole 9-slot electric motor, a 4-pole 6-slot electric motor, a 8-pole 12-slot electric motor, and a 10-pole 9-slot electric motor, a 10-pole 12-slot electric motor, a 8-pole 9-slot electric motor, the above type of the electric motor 2 can effectively reduce rotor magnetic leakage, increase magnetic flux, and help improve the efficiency of the electric motor 2.

Figure 26:
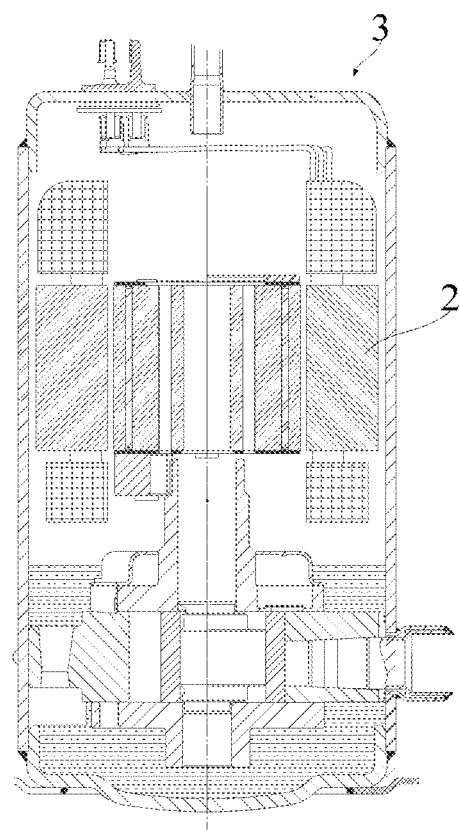
FIG. 26 shows a structural schematic diagram of a compressor according to an embodiment of the present disclosure.

According to the fifth aspect of the present disclosure, a compressor 3 is provided, as shown in FIG. 26, the compressor 3 comprises the rotor or the electric motor 2 as described in any of the above-mentioned embodiments, and therefore has all the beneficial effects of the rotor or the electric motor 2, and will not be repeated here.

The descriptions above are only preferred embodiments of the present disclosure, which are not used to limit the present disclosure. Any modifications, equivalent substitutions, improvements etc. within the spirit and principle of the present disclosure shall all be included in the protection scope of the present disclosure.

What is claimed is:

1. A rotor used in an electric motor, comprising:
   a plurality of first punches and a plurality of second punches stacked to form a rotor core;
   a plurality of openings provided in each of the plurality of first punches and the plurality of second punches along a circumferential direction of the rotor core, each of the plurality of openings having a V-shape that diverges along a respective radial axis away from a center axis of the rotor core, the plurality of openings dividing each of the plurality of first punches and the plurality of second punches into a rotor yoke and a plurality of pole caps, the plurality of pole caps arranged around an outer circumference of the rotor yoke, the plurality of openings extending in an axial direction of the rotor core to form a plurality of slots; and
   a plurality of magnets arranged in the plurality of slots in a two-to-one correspondence,
   wherein each of the plurality of first punches and each of the plurality of second punches comprises at least one connecting rib, each of the at least one connecting rib is disposed between adjacent two of the plurality of pole caps, and at least two of the plurality of openings of each of the plurality of second punches communicate with each other adjacent to one of the at least one connecting rib of the each of the plurality of second punches.

2. The rotor according to claim 1, wherein:
   each of the plurality of first punches comprises a plurality of first sub-punches and a plurality of second sub-punches, and the at least one connecting rib is provided between each adjacent two of the plurality of pole caps of each of the plurality of first sub-punches,
   each of the plurality of pole caps of each of the plurality of second sub-punches comprises a first pole cap, and one end of the first pole cap is connected to an adjacent pole cap through the connecting rib, and the other end of the first pole cap is not connected to the adjacent pole cap, each of the plurality of second punches is sandwiched between the plurality of first sub-punches; and/or each of the second sub-punches is sandwiched between the plurality of first sub-punches; and/or each of the plurality of second punches are sandwiched between the plurality of second sub-punches.

3. The rotor according to claim 2, wherein:

projections of the at least one connecting rib of the plurality of second sub-punches and projections of the at least one connecting rib of the plurality of first sub-punches on a plane perpendicular to the axial direction of the rotor core completely overlap.

4. The rotor according to claim 3, wherein:

a stack thickness of the plurality of first sub-punches is L1, and a sum of a stack thickness of the plurality of second punches and the plurality of second sub-punches is L, and L1 and L satisfy $0.0105(L1+L) \leq L1 \leq 0.1(L1+L)$.

5. An electric motor, comprising the rotor according to claim 1.

6. The electric motor according to claim 5, further comprising:

a stator body arranged around an outside of the rotor, wherein a rated torque of the electric motor is T, an inner diameter of the stator body is Di, and a torque per unit volume of the rotor is TPV, and the T, Di and TPV satisfy $$5.18 \times 10^{-7} \leq T \times Di^{-3} \times TPV^{-1} \leq 1.17 \times 10^{-6}, \text{ and}$$

$$5 \text{ kN·m·m}^{-3} \leq TPV \leq 45 \text{ kN·m·m}^{-3}, \text{ and}$$

wherein the unit of rated torque T is N·m, the unit of inner diameter Di is mm, and the unit of torque per unit volume TPV is kN·m·m$^{-3}$.

7. The electric motor according to claim 6, wherein:

the stator body further comprises a plurality of stator protruding teeth and a plurality of stator slots, the plurality of stator protruding teeth are arranged on an inner side wall of the stator body facing the rotor, and each of the plurality of stator slots is provided between adjacent two of the plurality of stator protruding teeth;

a coil is straddled one of the stator protruding teeth and located in the stator slot; and the number of the stator slots is Z, and the number of pole pairs of the rotor is P, and the Z and P satisfy Z/2P=3/2 or 6/5 or 6/7 or 9/8 or 9/10.

8. A compressor, comprising the electric motor according to claim 5.

9. A rotor used in an electric motor, comprising:

a plurality of first punches and a plurality of second punches stacked to form a rotor core;

a plurality of openings provided in each of the plurality of first punches and the plurality of second punches along a circumferential direction of the rotor core, each of the plurality of openings having a V-shape that diverges along a respective radial axis away from a center axis of the rotor core, the plurality of openings dividing each of the plurality of first punches and the plurality of second punches into a rotor yoke and a plurality of pole caps, the plurality of pole caps arranged around an outer circumference of the rotor yoke, the plurality of openings extending in an axial direction of the rotor core to form a plurality of slots; and a plurality of magnets arranged in the plurality of slots in a two-to-one correspondence, wherein each of the plurality of first punches and each of the plurality of second punches comprises at least one connecting rib, each of the at least one connecting rib is disposed between adjacent two of the plurality of pole caps, the plurality of openings of the first punches are not communicated with each other adjacent to one of the at least one connecting rib of the plurality of first punches, and at least two of the plurality of openings of each of the plurality of second punches communicate with each other adjacent to one of the at least one connecting rib of the each of the plurality of second punches.

10. The rotor according to claim 9, wherein:

a minimum radial thickness of the at least one connecting rib of the first punches is W1, and each of the plurality of second punches comprises at least one connecting rib, each of the at least one connecting rib is disposed between adjacent two of the plurality of pole caps, and a minimum radial thickness of the at least one connecting rib of the second punches is W2, and it satisfies $0.2 \leq W2/W1 \leq 2$.

11. The rotor according to claim 9, wherein:

at least two adjacent pole caps of the plurality of pole caps in the second punches are not connected to each other.

12. The rotor according to claim 9, wherein:

each of the plurality of first punches comprises a plurality of first sub-punches and a plurality of second sub-punches, and the at least one connecting rib is provided between each adjacent two of the plurality of pole caps of each of the plurality of first sub-punches, each of the plurality of pole caps of each of the plurality of second sub-punches comprises a first pole cap, and one end of the first pole cap is connected to an adjacent pole cap through the connecting rib, and the other end of the first pole cap is not connected to the adjacent pole cap, each of the plurality of second punches is sandwiched between the plurality of first sub-punches; and/or each of the second sub-punches is sandwiched between the plurality of first sub-punches; and/or each of the plurality of second punches are sandwiched between the plurality of second sub-punches.

13. The rotor according to claim 12, wherein:

projections of the at least one connecting rib of the plurality of second sub-punches and projections of the at least one connecting rib of the plurality of first sub-punches on a plane perpendicular to the axial direction of the rotor core completely overlap.

14. The rotor according to claim 13, wherein a stack thickness of the plurality of first sub-punches is L1, and a sum of a stack thickness of the plurality of second punches and the plurality of second sub-punches is L, and L1 and L satisfy $0.0105(L1+L) \leq L1 \leq 0.1(L1+L)$.

15. A rotor used in an electric motor, comprising:

a plurality of first punches and a plurality of second punches stacked to form a rotor core;

a plurality of openings provided in each of the plurality of first punches and the plurality of second punches along a circumferential direction of the rotor core, each of the plurality of openings having a V-shape that diverges along a respective radial axis away from a center axis of the rotor core, the plurality of openings dividing each of the plurality of first punches and the plurality of second punches into a rotor yoke and a plurality of pole caps, the plurality of pole caps arranged around the outer circumference of the rotor yoke, the plurality of openings penetrating along an axial direction of the rotor core to form a plurality of slots; and a plurality of magnets arranged in the plurality of slots in a two-to-one correspondence, wherein each of the plurality of first punches and each of the plurality of second punches comprises at least one connecting rib, each of the at least one connecting rib is disposed between adjacent two of the plurality of pole caps, each adjacent two of the plurality of pole caps in each of the plurality of second punches are separated by one of the plurality of openings adjacent to one of the at least one connecting rib of the each of the plurality of second punches.

16. The rotor according to claim 15, wherein:

each of the plurality of first punches comprises a plurality of first sub-punches and a plurality of second sub-punches, and the connecting rib is provided between each adjacent two of the plurality of pole caps of each of the plurality of first sub-punches, each of the plurality of pole caps of each of the plurality of second sub-punches comprises a first pole cap, and one end of the first pole cap is connected to an adjacent pole cap through the connecting rib, and the other end of the first pole cap is not connected to the adjacent pole cap, each of the second punches is sandwiched between the plurality of first sub-punches; and/or each of the second sub-punches is sandwiched between the plurality of first sub-punches; and/or each of the second punches is sandwiched between the plurality of second sub-punches.

17. The rotor according to claim 16, wherein:

projections of the connecting rib of the plurality of second sub-punches and projections of the connecting rib of the plurality of first sub-punches on a plane perpendicular to the axial direction of the rotor core completely overlap.

18. The rotor according to claim 16, wherein:

a stack thickness of the plurality of first sub-punches is $L1$, and a sum of a stack thickness of the plurality of second punches and the plurality of second sub-punches is $L$, and $L1$ and $L$ satisfy $0.0105(L1+L) \leq L1 \leq 0.1(L1+L)$.

* * * * *